(12) United States Patent
Gulick et al.

(10) Patent No.: US 12,466,618 B2
(45) Date of Patent: Nov. 11, 2025

(54) POUR SPOUT SYSTEM AND METHOD INCLUDING REINFORCING MATERIALS AND AUXILIARY DEVICES

(71) Applicants: Matthew Allen Gulick, Savannah, GA (US); Paul R. Metcalfe, Solon, OH (US)

(72) Inventors: Matthew Allen Gulick, Savannah, GA (US); Paul R. Metcalfe, Solon, OH (US)

(73) Assignee: Marginal IP LLC, Solon, OH (US)

( * ) Notice: Subject to any disclaimer, the term of this patent is extended or adjusted under 35 U.S.C. 154(b) by 502 days.

(21) Appl. No.: 17/943,846

(22) Filed: Sep. 13, 2022

(65) Prior Publication Data
US 2023/0086837 A1    Mar. 23, 2023

Related U.S. Application Data

(63) Continuation-in-part of application No. 17/483,211, filed on Sep. 23, 2021, now Pat. No. 11,713,158.

(51) Int. Cl.
*B65D 47/12* (2006.01)
*B65D 41/04* (2006.01)

(52) U.S. Cl.
CPC ....... *B65D 47/122* (2013.01); *B65D 41/0478* (2013.01); *B65D 2251/02* (2013.01); *B65D 2251/20* (2013.01)

(58) Field of Classification Search
CPC .............. B65D 47/122; B65D 41/0478; B65D 2251/02; B65D 2251/20; B65D 25/48; B26F 1/32; B67B 7/26
See application file for complete search history.

(56) References Cited

U.S. PATENT DOCUMENTS

| 1,357,304 | A | * | 11/1920 | Valdes | B65D 5/74 229/125.15 |
| 2,198,564 | A | * | 4/1940 | Robison | B65D 83/7713 222/83.5 |
| 4,948,015 | A | * | 8/1990 | Kawajiri | B65D 5/749 222/541.9 |
| 5,833,112 | A | * | 11/1998 | Pape | B65D 5/748 222/541.6 |

(Continued)

FOREIGN PATENT DOCUMENTS

| EP | 0505388 B1 | * | 7/1995 |
| JP | 2002002758 A | * | 1/2002 |

*Primary Examiner* — Bob Zadeh
(74) *Attorney, Agent, or Firm* — Lippes Mathias LLP

(57) ABSTRACT

A reusable pour spout system that may be attached to different container types to dispense different substances, including course and fine granular materials and liquids. A port component has a proximal tubular end and a flange that is larger in diameter than the tubular portion. The flange further includes a hole-forming structure adapted to pierce the wall of a container, leading to a ramp that captures the container material when the port component is rotated by a user. This positions the flange within the container, with the tubular end exposed to pour the contents from the container. A cap may be provided to seal off the port. The tubular end of the port component, the nut, and the cap may all be threaded. Integrally formed port devices are also disclosed along with bolstering and reinforcing layers and materials to control hole formation.

14 Claims, 29 Drawing Sheets

(56) References Cited

U.S. PATENT DOCUMENTS

| | | | |
|---|---|---|---|
| 7,540,405 B2 * | 6/2009 | Sase ..................... | B65D 5/748 229/125.14 |
| 2023/0086837 A1 * | 3/2023 | Gulick ............... | B65D 41/0478 222/478 |

* cited by examiner

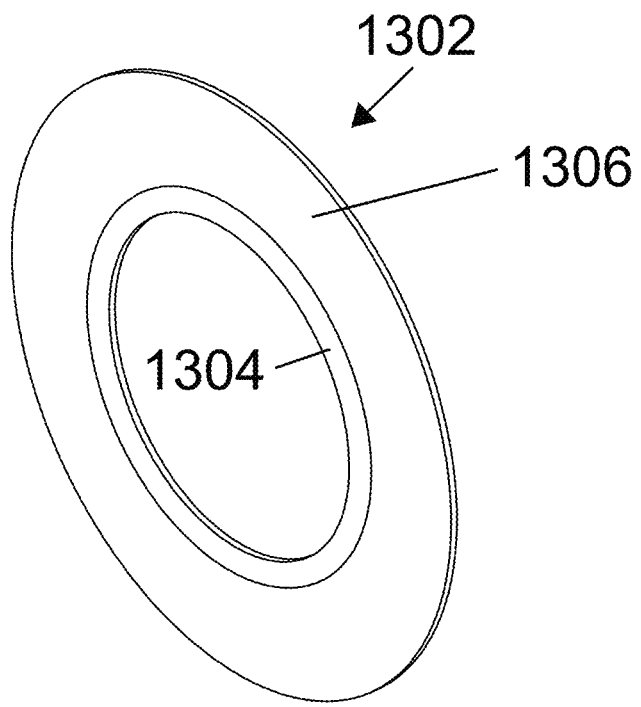
Fig. 13A
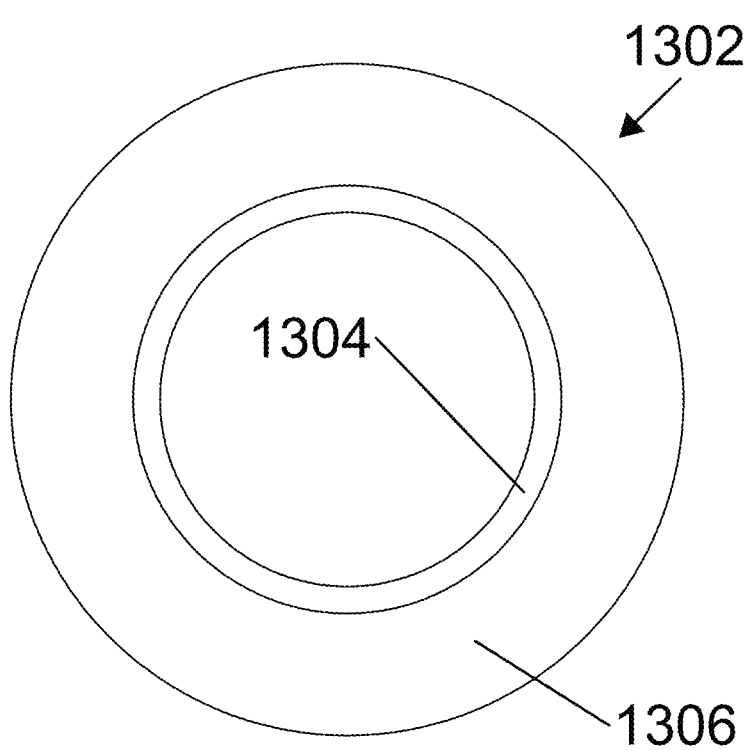 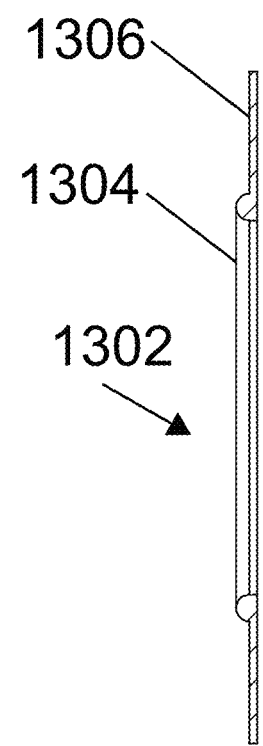
Fig. 13B  Fig. 13C

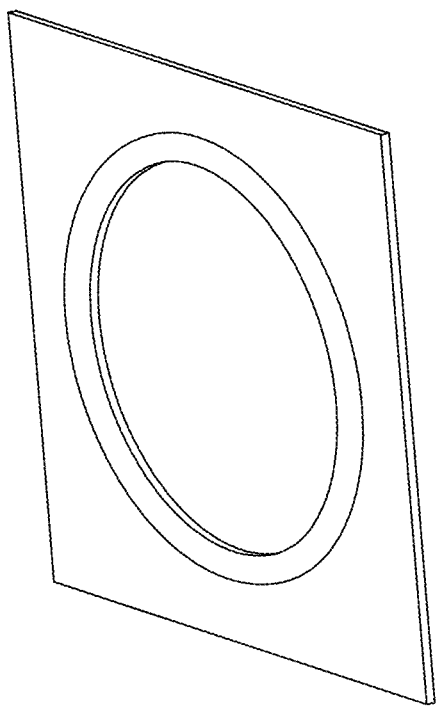
Fig. 14A
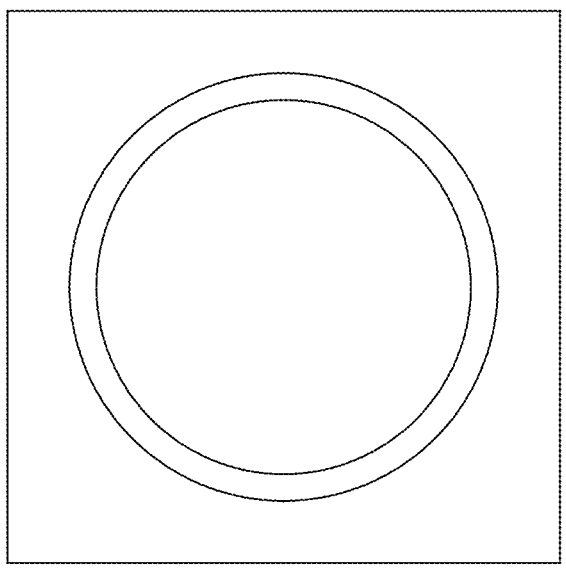 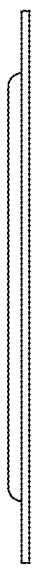
Fig. 14B      Fig. 14C

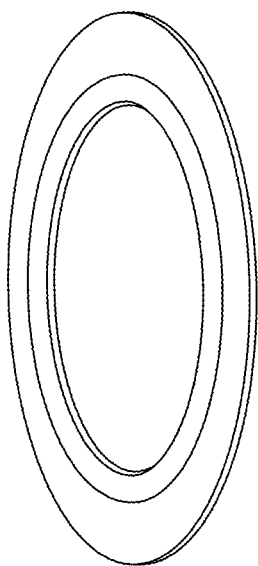 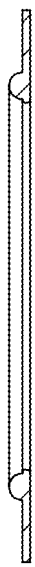 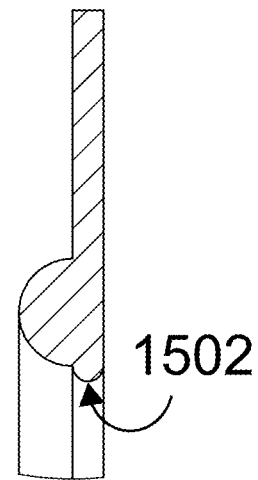
Fig. 15A     Fig. 15B     Fig. 15C
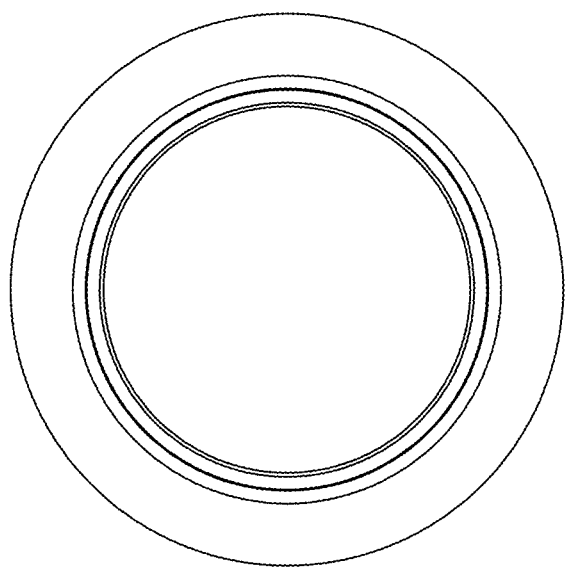 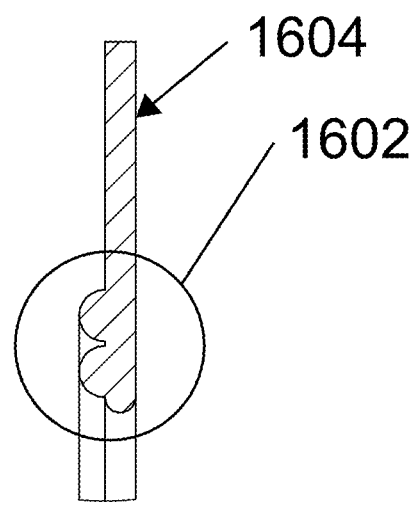
Fig. 16A     Fig. 16B

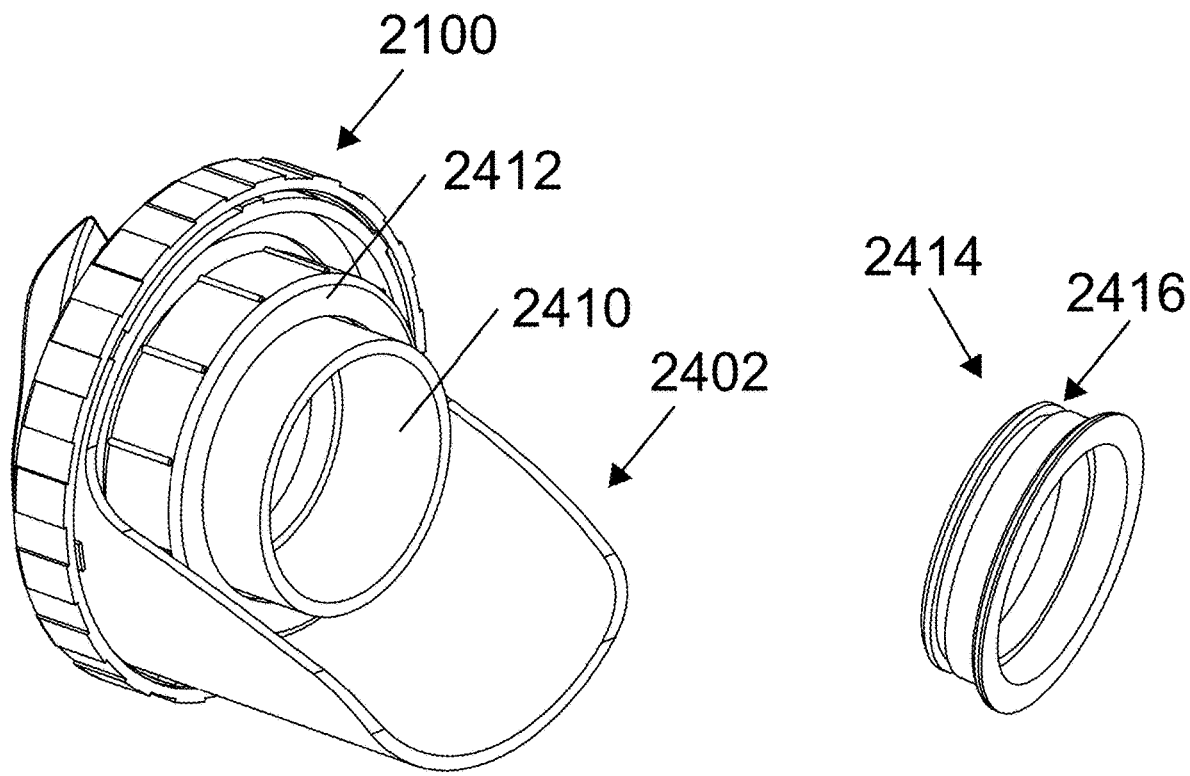
Fig. 24D     Fig. 24E
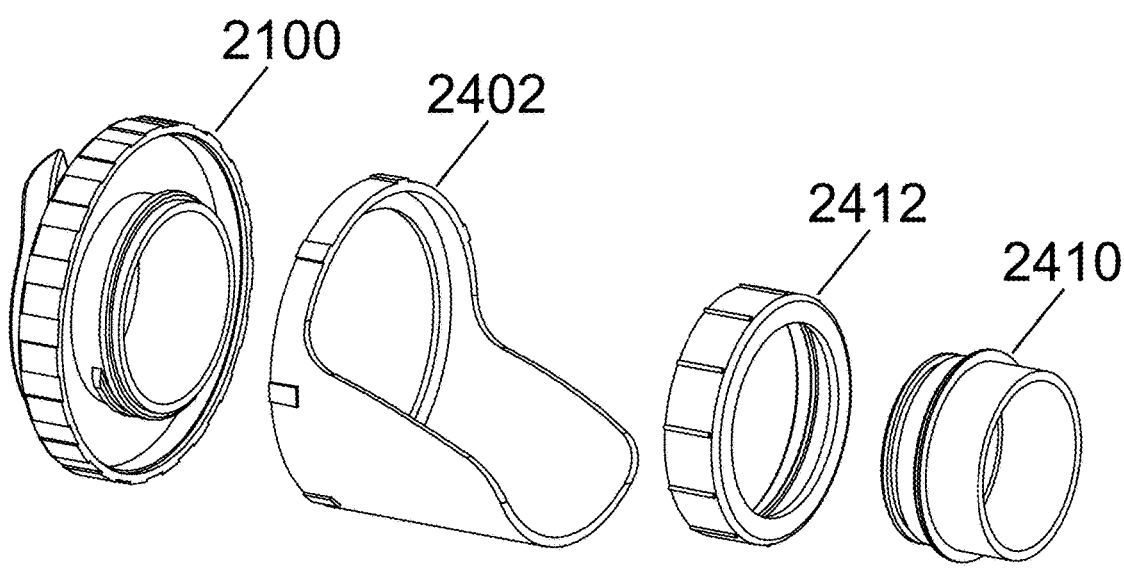
Fig. 24F

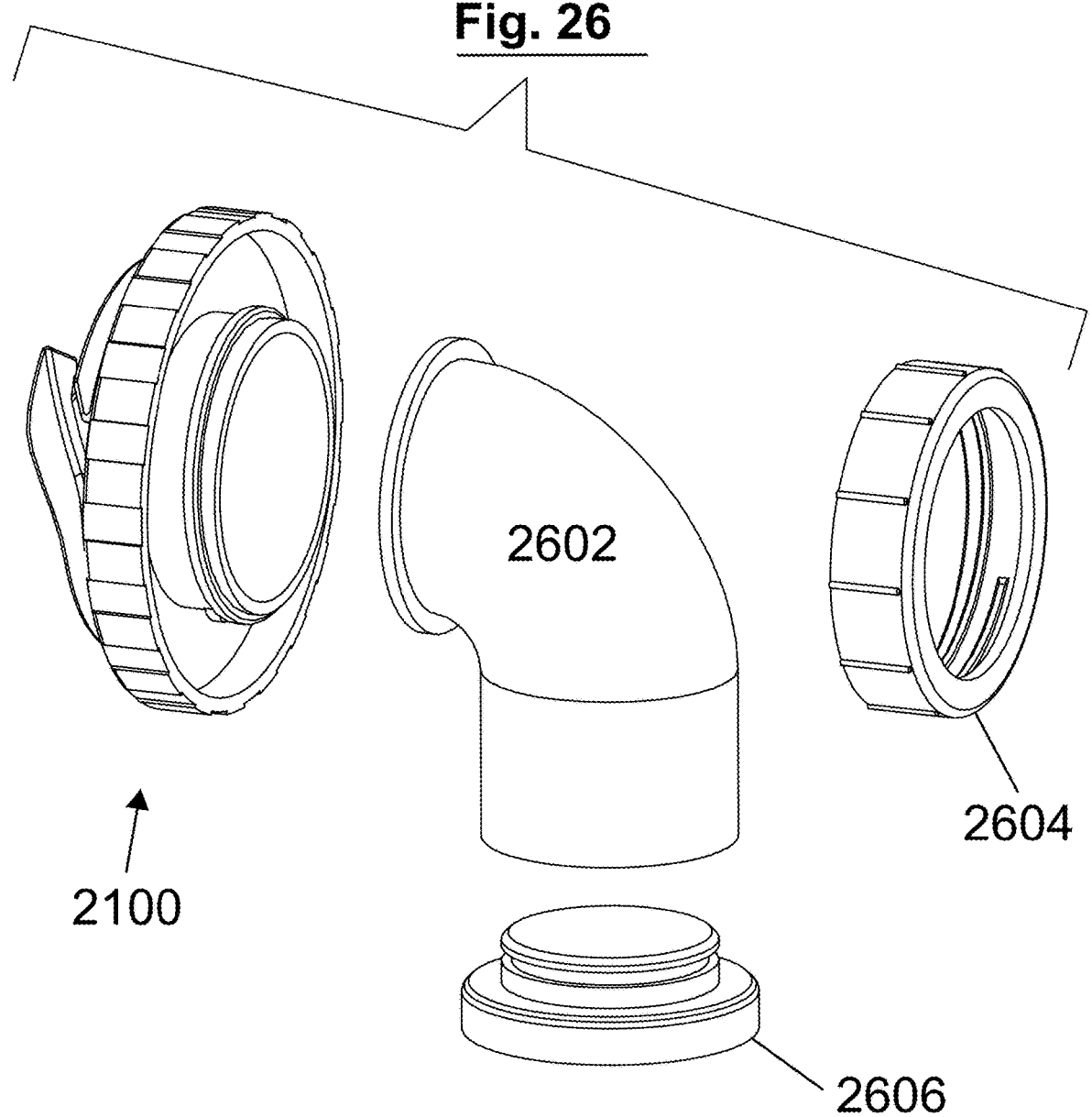

POUR SPOUT SYSTEM AND METHOD INCLUDING REINFORCING MATERIALS AND AUXILIARY DEVICES

REFERENCE TO RELATED APPLICATIONS

This application is a continuation-in-part of U.S. application Ser. No. 17/483,211, filed Sep. 23, 2022, the entire content of which is incorporated herein by reference.

FIELD OF THE INVENTION

This invention relates generally to container spouts and, in particular, to a reusable system adapted for attachment to bags and other containers for granular and other flowable materials.

BACKGROUND OF THE INVENTION

Bags containing a wide variety of granular, bulk, powder, food, fertilizer, pellets, liquids, absorbents, pharmaceuticals, fuels, chemicals, and like materials are widely used through worldwide commerce for many different end uses. These bags are filled, transported, stored and ultimately the contents poured out. If the contents are not completely poured out, the bag is often sealed by way of rolling the opened end, twisting the open end, and using a rubber band or the like, or using a zippered closure if provided with the original bag, and other attempted closing means with limited effectiveness. Even with the zippered closure it often is damaged and does not seal effectively or requires too much precision and time for effective use.

When a partially opened bag is exposed to the surrounding environment, the contents can absorb moisture, which for some materials leads to clumping and becomes difficult to use as a granular state for dispensing and measuring, aside from making flow difficult in simple pouring and material handling systems and the like. These clumps then must be broken by impact or compression and can be very difficult and is also time consuming and very undesirable. Some materials degrade from exposure to the atmosphere after a container is opened, shortening useable lifespan, effectiveness or safety.

The bags the different materials are shipped in are made from different materials based on the specific need of the internally contained material, the transport and storage means, and end market in commerce. Some bags are strengthened with woven strands for high strength and are quite tear resistant and are often used for more dense contents, larger volume bags and generally heavier material containment.

Some bags, for example, for consumer coffee, are very thin, often multi-layer (polypropylene liner) and quite tear-prone when cut or pierced. This means once a tear is propagated, the bag material it is not disposed to stop tearing and the tear continues with little applied force, becoming somewhat uncontrollable. Mylar and HDPE (high-density polyethylene) thin film sheet materials (coffee bags, consumer cereal bags, most single-use plastic grocery bags and many others) are examples of thin plastic sheet or film materials that exhibit this tearing-prone behavior.

SUMMARY OF THE INVENTION

This invention improves upon the existing art by providing a pour spout system that may be attached to many different container types to dispense many different substances, including course and fine granular materials and liquids. The system may be attached in virtually any convenient location on bags and other flexible packaging, as well as semi-rigid or rigid containers depending upon wall material, thickness or other factors. In all embodiments, the pour spout system may be removed and reused.

A pour spout system constructed in accordance with the invention includes a port component having a proximal tubular end, a distal end with a flange, and a through bore. The proximal tubular end and bore may be cylindrical, and the flange may be circular or cylindrical as well. The flange of the port component includes a proximal surface that is larger than the diameter of the proximal tubular end of the port component. The flange further includes a hole-cutting structure adapted to pierce the wall of a container, with a cutting edge adapted to form a hole in the container when the port component is rotated by a user after piercing. The flange may include a gap with a ramp through which container material advances as the port component is rotated until the flange is fully within the container. The cutting edge may be integrally formed with the port component or may form part of a separate blade.

Following the formation of the hole in the container, the flange is within the container, and the hole cut in the container is aligned with the through bore. The proximal end of the port component is configured to receive a nut that traps the wall of the container between the nut and the flange when tightened by a user, and a cap is provided to seal off the through bore. In a preferred embodiment, the proximal tubular end of the port component, the nut, and the cap are all threaded, though bayonet, magnetic and other coupling mechanisms may be used.

The cap may include a proximal end with a user-operated aperture through which the contents of the container are poured. The aperture may be adjustable, from an open condition to a closed, sealed condition, and may include a pouring trough in communication with the aperture. The proximal end of the cap, with or without that aperture, may include an inner surface with an axial protrusion that pierces the container to assist with centering the cut in the container. The system may further include one or more compressible, resilient seals, and the cap may be sized or marked for use as a measuring cup.

A method of attaching a pour spout to a container having a wall with inner and outer surfaces, comprising the steps of:
choosing a location on the container to attach a pour spout;
providing the pour spout system of claim 1;
piercing the container with the hole-cutting structure of the port component at the chosen location;
rotating the port component until the flange of the port component faces the inner surface of the container wall;
installing the nut onto the port component so that the container wall is trapped between the nut and the flange of the port component; and
installing the nut onto the port component to seal off the pour spout.

The method may further include the steps of removing the cap, nut and port component for reuse.

Embodiments of the invention include integrally formed piercing/cutting structures that do not require a separate (i.e., metal) cutting blade. Further embodiments include integrally formed structures that retain the wall of the container without the need for a separate component such as a threaded fastener. Still further embodiments include a layer of bolstering/reinforcing material to control the hole cutting in the bag, particularly if tearing occurs.

BRIEF DESCRIPTION OF THE DRAWINGS

FIG. 13A is an isometric view of a circular bolstering/sealing ring having a single sealing lobe;

FIG. 13B is an orthographic view of a circular bolstering/sealing ring having a single sealing lobe;

FIG. 13C is a cross section view of a circular bolstering/sealing ring having a single sealing lobe;

FIG. 14A is an isometric view of a square or rectangular bolstering patch layer;

FIG. 14B is an orthographic lobe-side view of a square or rectangular bolstering patch layer;

FIG. 14C is a cross section of a square or rectangular version of a bolstering patch layer;

FIG. 15A is an isometric view of a bolstering ring having a smaller lobe to create both facial and radial seals potentially for more demanding applications;

FIG. 15B is a cross section view of the ring of FIG. 15A;

FIG. 15C is a detail cross section view of the ring of FIG. 15A;

FIG. 16A is an orthographic view of a multiple-lobe bolstering structure adapted to seal on the side wall of a device having an o-ring groove;

FIG. 16B is a detail cross section of the multiple-lobe bolstering structure of FIG. 16A;

FIG. 24D shows a pouring device and spout along with a plug retained by a cap having a center hole;

FIG. 24E illustrates an alternate male plug having an o-ring groove with no protruding grip/measuring cylinder;

FIG. 24F is an exploded view showing a pour device, spout, plug and cap;

FIG. 26 shows an angled pipe that attaches to a pour device by a through-hole cap that slips on and goes around the bend in the pipe;

DETAILED DESCRIPTION OF THE PREFERRED EMBODIMENTS

Figure 1A:
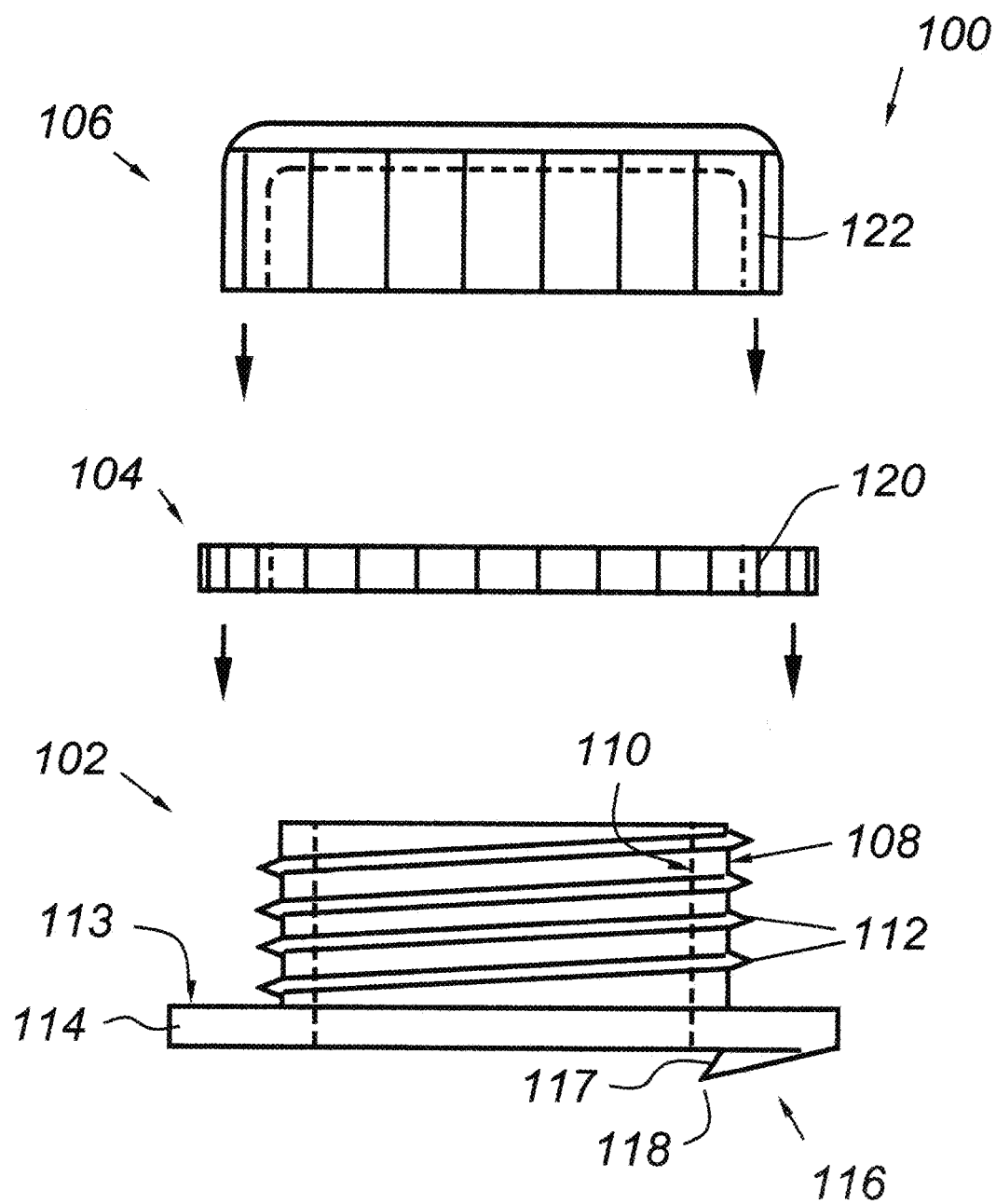
FIG. 1A is an exploded view of a basic embodiment of the invention illustrating important components.
Figure 1B:
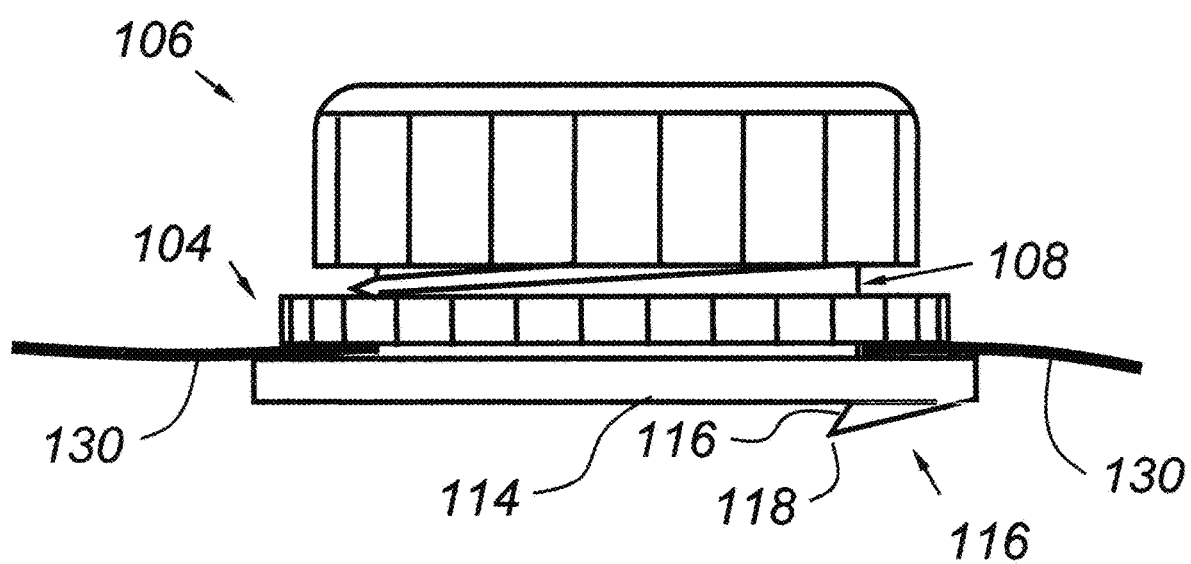
FIG. 1B shows the components of FIG. 1A in an assembled state.

Now making reference to the accompanying drawings, FIG. 1A depicts a simplified, exploded view of the invention at 100 prior to installation onto a container, and FIG. 1B shows the assembly of FIG. 1A in an installed condition. It is important to point out that FIGS. 1A, B are for introductory purposes only, and leave out details about certain features and alternative embodiments described in further detail below.

The invention comprises three primary components; namely, a port component 102, a nut 104, and a cap 106. Some embodiments may include additional components, but all embodiments at least include components 102, 104, 106. Components 102, 104, 106 may be constructed of any durable, rigid or semi-rigid materials, though in the preferred embodiments all are made from injected molded or machined plastic such as polypropylene, polyethylene, polystyrene, nylon, polycarbonate, vinyl, or the like. Food-grade materials are preferred for food-contact applications. For more durable or high-strength applications the components can be constructed of metals, either cast, machined, injected, printed, or the like. The components may be any color.

Port component 102 includes a proximal, tubular end having an inside diameter (I.D.) 110, an outside diameter (O.D.) 108, and threads 112. The invention may cover a range of diameters depending upon the material(s) to be dispensed. The invention is not limited to solid materials, and may be used with liquids, particularly if appropriate seals are used (i.e., O-rings). For example, I.D.s of less than an inch are possible for readily flowable or fine-grained materials, whereas, for larger granular solids, the I.D. may be in the range of 3"-6". For most applications, the I.D. is in the range of 1"-3", more preferably about 2-2.5". The O.D would of course vary with the I.D. to maintain a reasonable wall thickness "W" and ease of fabrication.

The port component 102 further includes an integrally molded flange 114 with any appropriate thickness. The flange is preferably generally round, with a diameter greater than O.D. 108, and is more closely matched to the diameter of nut 104. In the preferred embodiments, the flange 114 includes a proximal surface with a flat land 113 to better trap container material as explained with reference to FIG. 1B. "Flat," however, would not preclude possible forms of surface roughing of land surface 113 such as stippling, serrations, etc., to increase friction. The same holds true for the bottom surface of nut 104.

The flange of the port component 102 further includes a distally extending structure 116 with a cutting edge 117. As explained with reference to installation steps described herein, this structure is used to penetrate the container and form a hole in the wall of the container as the flange component 102 is rotated. As such, the structure 116 preferably includes a pointed distal end 118 to penetrate the container wall to initiate the cutting process.

The cutting edge (and penetrating end) may be integrally formed with the port component, particularly if fabricated from a hard material such as polycarbonate. In the preferred embodiments, however, at least the cutting edge is made of a different material such as stainless steel or other metal and added to the port component as insert-molded, i.e., molded-over in injection molding or casting, or with one or more rivet fasteners or the like, or with melted posts, etc. As a further alternative, at least the cutting edge may be removable and replaceable using one or more threaded fasteners, for example.

Both the nut 104 and cap 106 preferably have threads that match the threads of the port component 102. In the preferred embodiment all threads are right-handed. The nut may be of any thickness to maintain desired rigidity, and one or both of the nut and cap may include outer surfaces with flutes 120, 122 or other structures to enhance gripping. As an alternative to the cap making a threaded connection, other closure mechanisms may be used such as bayonet fittings or the like. Further, magnets can be used for holding the cap onto port (with no thread or bayonet) as attracting pairs or with ferric material on one side and magnet opposite. The degree of hold can be dictated by magnet field strength and quantity used. Rotating to release and pull off a cap similar to the bayonet function would be a desirable yet simple functional alternative.

The interior of the cap may also be of a predetermined size and/or include markings enabling the cap to be used as a measuring cup. For example, the cap may hold a half cup (or other amount) of material when fully filled, or markings within the cap may show volume (or approximate weight).

FIG. 1B is a drawing that shows the simplified assembly of FIG. 1A attached to a container. The wall of the container is shown at 130. Note that edges of the hole cut into the container extend all the way up to the outer diameter 108 of the port component 102. Indeed, with some configurations, the hole may be slightly smaller than O.D. 108, such that the container material curls slightly against the O.D. for an enhanced seal. But importantly, in all embodiments, as the port component is rotated and the cutting edge cuts the container, the flange progresses through the hole, with land surface 133 positioned against the inner surface of container wall 130. As such, when nut 104 is tightened, the wall 130 of the container is trapped between the flange 114 and washer for a tight seal, including a water- or air-tight seal depending upon tolerances, the use of O-rings, and so forth.

The invention may be installed in any convenient location on a bag or other container. Once a location is selected, a user pierces the container with the cutter structure on the distal end of the port component and turns the port component until a hole is cut into the container material. The port component is preferably turned in clockwise direction. Once the hole is cut, the cutout material may be removed from the port component. In the event that a portion of the cutout remains intact or falls into the container, the invention will operate successfully nevertheless.

Figure 2:
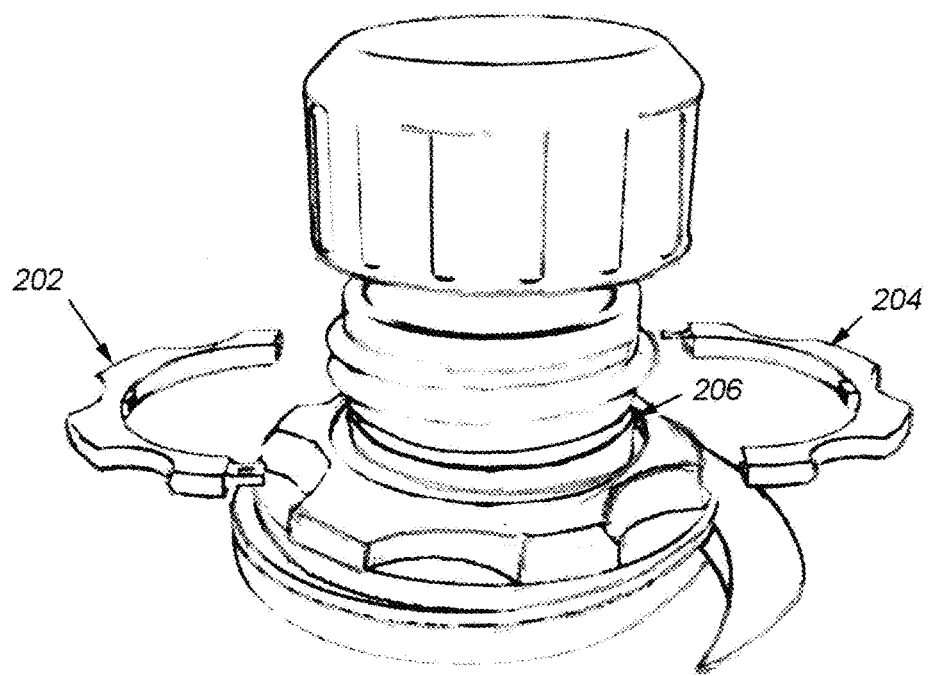
FIG. 2 is a perspective view of an embodiment of the invention using a multi-part, snap-on grip for turning.

Different devices and techniques may be used to rotate the port component and center the cut that will now be described. To rotate the port component, a user may simply grasp the threaded end of the component and rotate it. As a first alternative, the invention may include the multi-part thumb grip shown in FIG. 2. In this embodiment, two parts 202, 204 are assembled onto a relief 206 in the threaded end of the port component. Once assembled, the thumb grip rotates with the port component, enabling a user to more easily rotate the component relative to the container. In the preferred embodiment, however, it has been found that a user may simply install the cap onto the threaded end and use the cap to rotate the port component. Once the nut is tightened, the cap may be removed as needed to pour the contents of the container.

Figure 3:
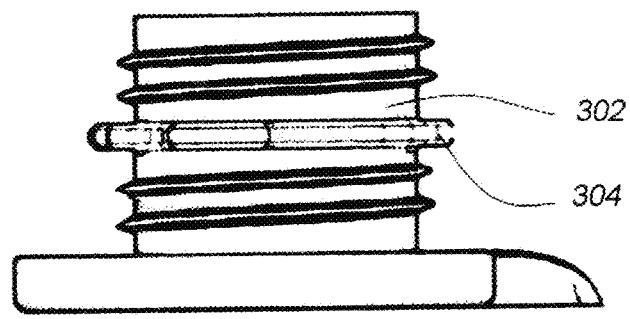
FIG. 3 is a side view of the grip in position.
Figure 4:
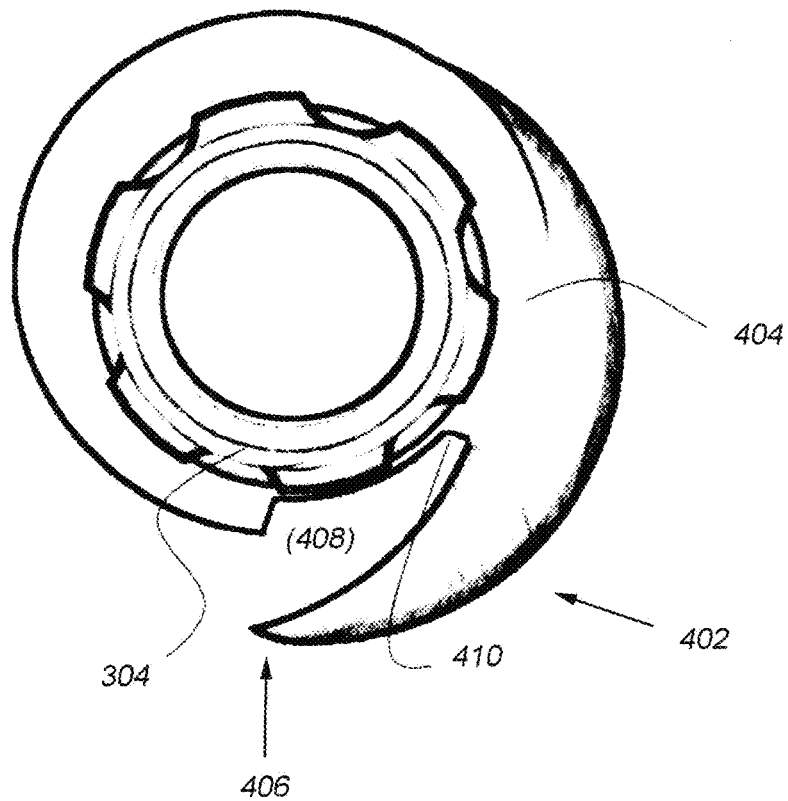
FIG. 4 is a drawing that shows one style of container cutting structure.
Figure 5A:
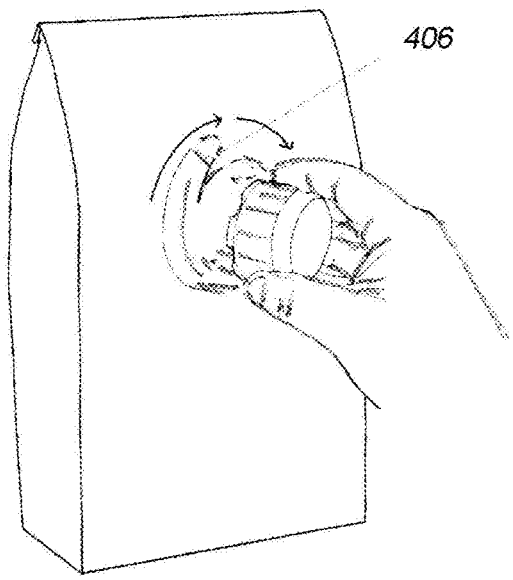
FIG. 5A is a first drawing of a sequence that shows how the inventive spout is installed onto a flexible container.
Figure 5B:
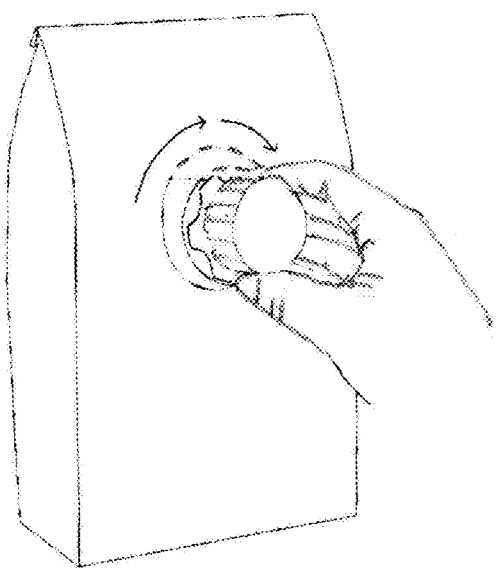
FIG. 5B continues the sequence of FIG. 5A.
Figure 5C:
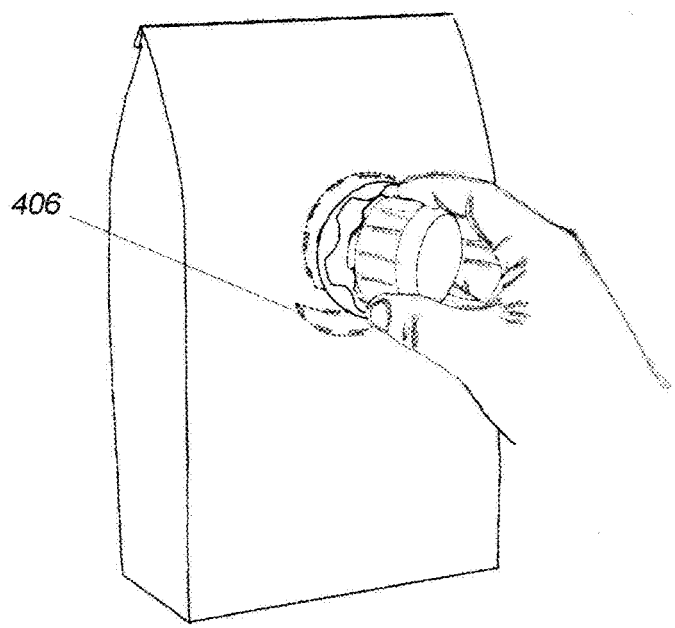
FIG. 5C nearly completes the sequence of FIG. 5A.

FIG. 3 shows the thumb grip assembled onto the threads of a port component 302. The grip 304 may be disassembled prior to installation of the nut after cutting the hole, or the nut may be loosely held onto the threaded end during the cut. FIG. 4 is a top-down view of the embodiment of FIG. 3, also showing one version of a cutting structure, in this case a "crab-claw" design 402. The flange, shown at 404, includes a pointed tip 406, leading to a gap 408 terminating in a cutting edge 410. In this case a user pierces that container with point 406 and cuts the hole as the port component is rotated. FIGS. 5A-C show a user piercing and rotating a port component according to the invention.

Figure 6:
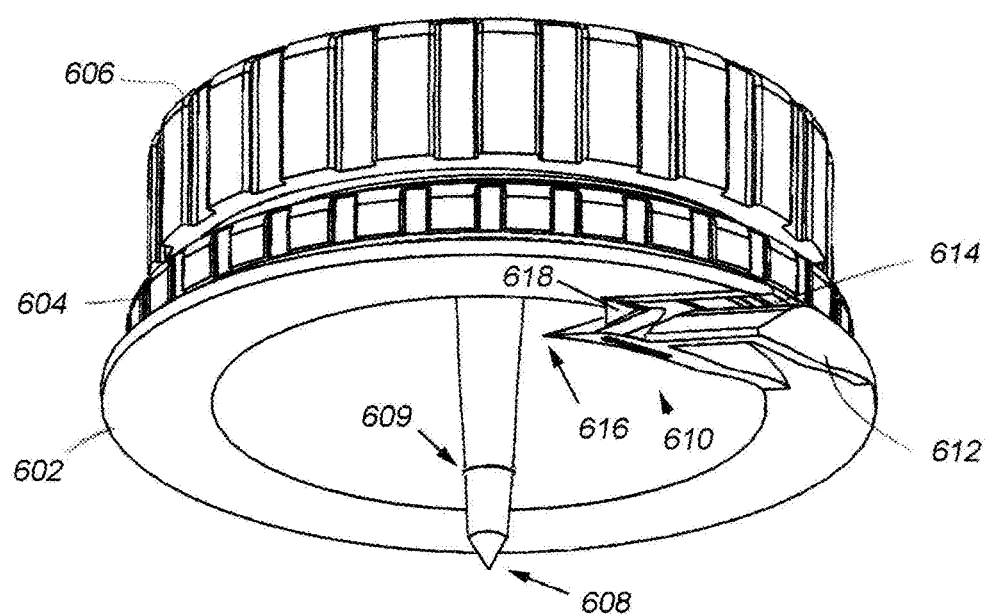
FIG. 6 shows how a cap may include a distally oriented pin used to center the a cutting operation.
Figure 7:
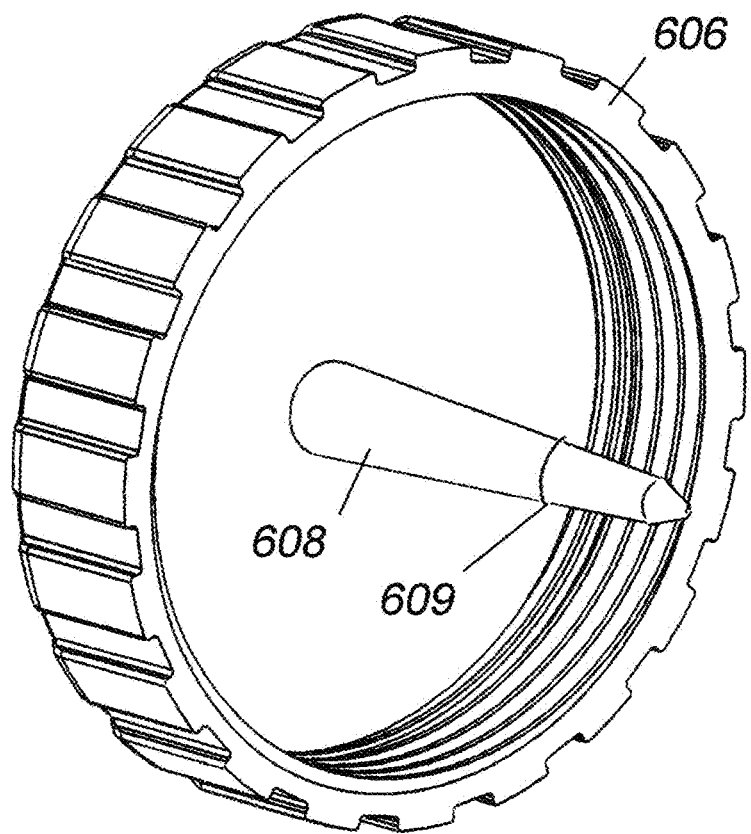
FIG. 7 is an oblique view showing a centering pin, preferably integrally molded into a cap 606.
Figure 8:
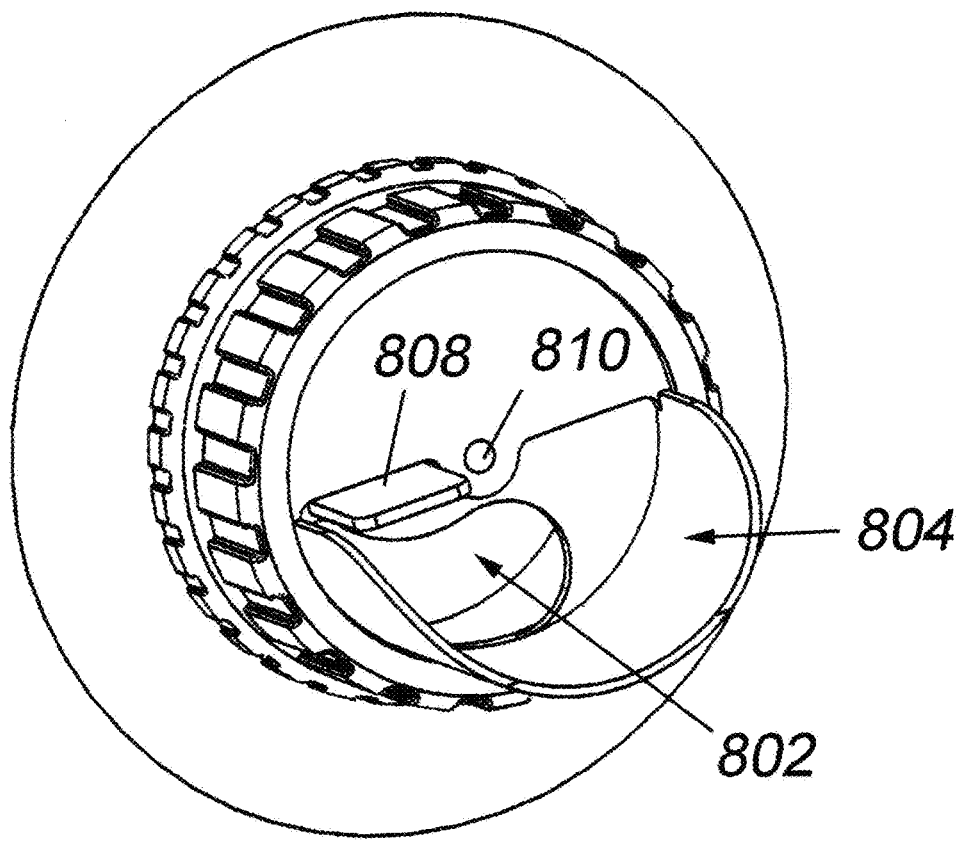
FIG. 8 depicts a further alternative wherein the proximal end of the cap is replaced with an adjustable aperture and pouring trough.

FIGS. 6, 7, 8 illustrate alternative aspects of the invention. For example, FIG. 6 shows a different cutting assembly 610, including a ramp structure 612 that leads to a gap 614. The container material is pierced with point 616 and an axially oriented cutting blade 618.

FIG. 6 also shows how the cap 606 may include a distally oriented pin 608 used to center the assembly during the cutting operation, FIG. 7 is an oblique view showing pin 608, preferably integrally molded into cap 606. The "point" of the pin 608 may have any appropriate degree of sharpness.

FIG. 8 depicts a further alternative wherein the proximal end of the cap is replaced with an adjustable aperture 802 and pouring trough 804. This arrangement enables a more controlled dispensing of smaller granular contents. In operation, tab 808 would be incrementally moved from a fully closed to open position. In FIG. 8, aperture 802 is about halfway open. Item 810 shows where a centering pin like pin 608 could be located.

Figure 9:
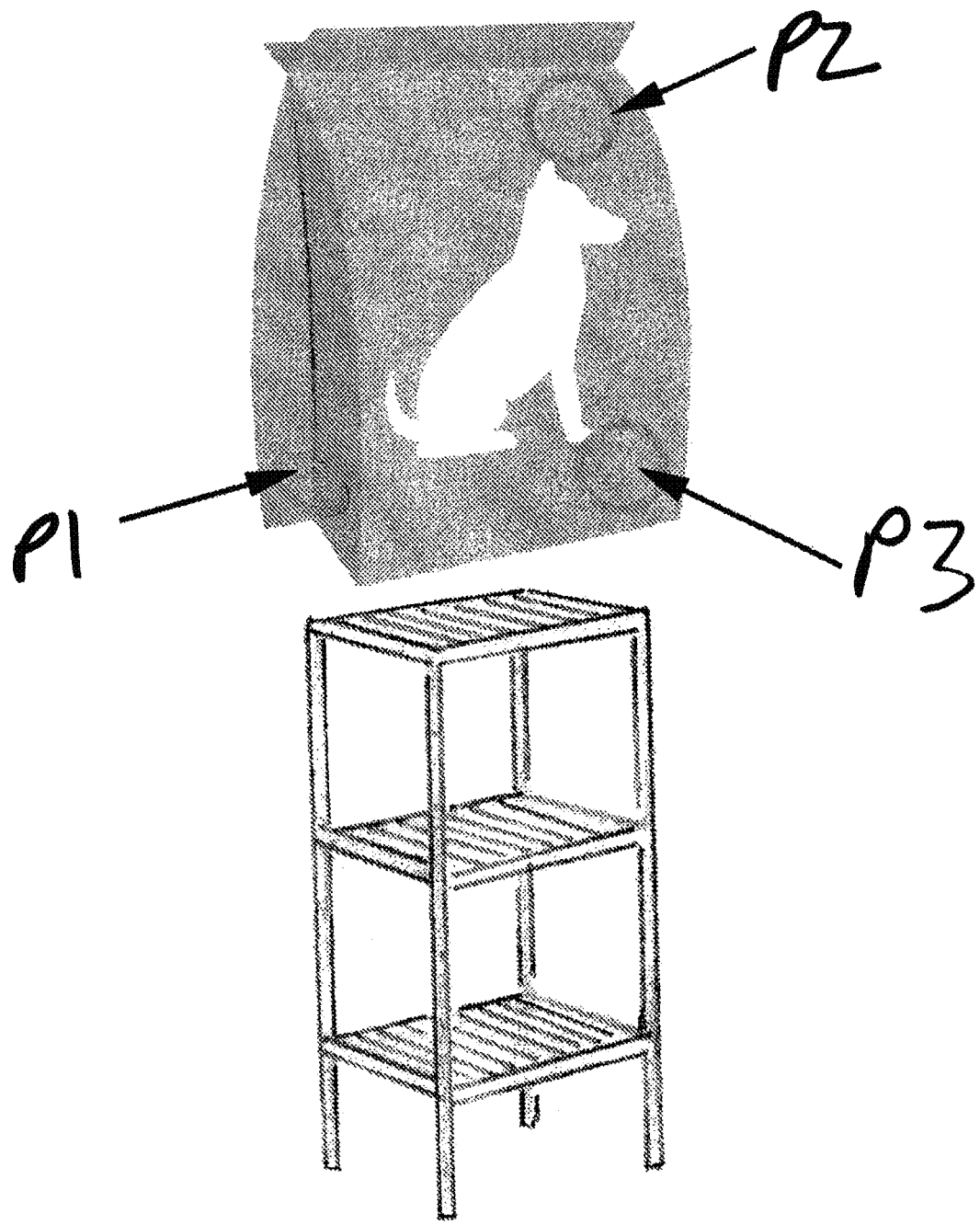
FIG. 9 shows various possibilities for locating the inventive spout depending upon weight, whether the container will be on a raised platform, and other factors associated with container contents and use.

Regardless of the embodiment, the user first determines where on the container the reusable spout should be installed. FIG. 9 shows various possibilities for locating the device, depending upon weight, whether the container will be on a raised platform, and other factors associated with container contents and use.

Making reference to FIG. 6, prior installation, cap 606 would be tightened down completely to enable clockwise torque required for the cutting operation. The cap is the mechanical handle of sorts to install into a bag/container. Nut 604 may be backed off as far as possible from the flange 602 to offer space for the bag/container material to ride into the space between nut 604 and flange 602.

Having located the center of installation, the user would push the piercing/cut guide centering pin integral to either the cap or the aperture plate version through the bag/container. The entire assembly would then be rotated clockwise so the piercing point 616 in front of the blade 618 pierces and cut the material during rotation. The ramp 612 behind the piercing point 616 guides the container material up to the blade for cutting. The piercing pin 608 acts as the center for the "compass-action" cutting.

The process continues, pushing lightly while rotating clockwise until the blade cuts a complete circle from the bag/container and the flange 602 is entirely inside the container and bag/container material is sandwiched between the flange 602 and nut 604. The nut 604 is then tightened onto the bag/container material, enabling sealing and mechanical securement. The cap is then rotated counterclockwise to remove it, and the circular cutout of the bag/container will be stuck onto the piercing pin by way of a) the tapered shaft and or b) the barbed male or female ring or rings 609 that act as mechanical grips to hold the bag cutout until it is discarded. The cap may then be reinstalled and tightened securely to seal the container assembly. If the adjustable aperture is used it would be closed to seal the port.

When material is ready to be dispensed from the bag/container, the cap is removed (or the cap is loosened and the aperture plates are adjusted to the desired size and pour). The spout is closed by reinstalling the cap or closing aperture and tightening the cap. If the user wishes to expel air inside the bag, the cap or aperture plates may be left open and the bag/container may be squeezed or rolled, etc. to remove excess air, then resealed to keep contents fresher for pet food and other applications.

As a further option, the cap may incorporate a one-way valve (i.e., flap, bicuspid, tricuspid) such that air may be expelled without being sucked back in. If further air degradation mitigation is desired for particular applications, a vacuum supply may be connected to a port in the cap (not shown) to create vacuum pressure in the bag/container or positive pressure with a selective pressurized gas or liquid that can protect and or react with internal contents via the convenience of the spout system.

Figure 10:
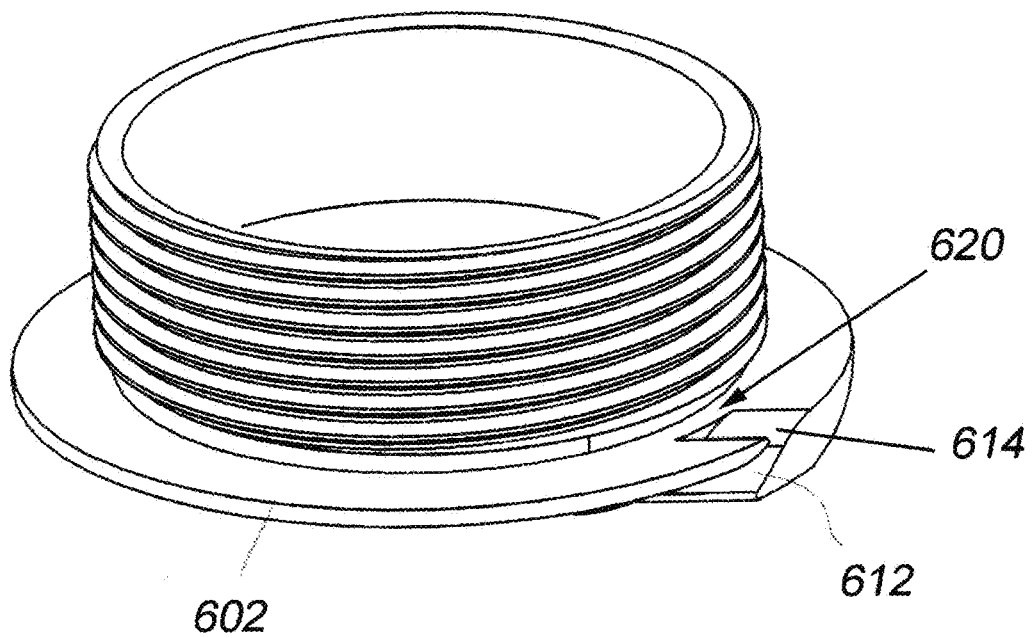
FIG. 10 is a perspective view of a port component showing how at least a portion of the flange extends circumferentially all the way around the threaded end for a tighter seal.

It should be apparent that a goal of the invention is to seal and reseal the bag/container as tightly as possible between uses. FIG. 10 is a perspective view of a port component showing how at least a portion of the flange extends circumferentially all the way around the threaded end, including a small land portion 620 between the threaded tube and gap 614 that transitions to ramp 612. This is in contrast to the "crab claw" design that featured a much larger gap. With the configuration of FIG. 10, particularly if O-rings) are used between the nut and flange, a comprehensive seal may be achieved.

As an alternative to sealing with O-rings, two opposing lobes on the nut may be used to facially seal and offer mechanical grip on the bag/container material pressed against the flat face of the flange. These lobes can either be over-molded rubber or rigid with the use of a rubber washer of sorts on the flat face flange. The inside or smallest diameter rib or lobe on the nut can ride and seal on the continuous surface 620. The seal between the cap and the flange end can be facial of the two flat surfaces coming together in the depth of the cap with a resilient rubber washer in the cap, alternatively, overmolded rubber in the cap or similar arrangements where rigid and soft materials make a seal depending on the degree of sealing or airtightness desired.

To remove the spout system from a container for re-use, the installation sequences described above are essentially carried out in reverse order. That is, the cap is removed, the nut is removed, and the port component is pulled out of the container. In contrast to installation, the port component need not be "unscrewed" since, presumably the bag or other container is empty and need not be physically preserved.

Embodiments of the invention thus far described include a distal flange with a ramp and blade such that when the container is penetrated and the port component is turned a hole is cut into the container and the flange is disposed within the container and a fastener such as a nut is used to trap or capture the wall of the container between the flange and the nut. However, it should be understood that a razor-sharp blade in not required in accordance with the invention, and that other structures may be used to capture and retain the wall of the container. For example, is some alternative embodiments described herein below, a piercing and/or cutting structure may be integrally formed with the distal flange, obviating the need for a separate material such as a metal cutting blade. Further, a frictional or interference fit washer may be used in lieu of a threaded fastener. Still further, a separate fastener component may be replaced with an integrally formed proximal flange, such that when the port component is turned, the wall of the container is trapped between inner and outer flanges.

For bag or container materials that are either tear-prone or have lower tensile strength sufficient to support the use of the device, multiple, convenient, and low-cost strengthening apparatus and methods have been developed. In some instances, the bolstering or reinforcing material may include a pre-formed aperture, whereas in other embodiments, the device may simultaneously cut through the bolstering or reinforcing material and the container wall, particularly if a sharp cutting blade is provided. One solution resides in a high tensile strength and tear resistant layer or film that attaches to the bag/container material and has a hole generally in the center for insertion of the sealing/pouring device.

Where beneficial to position the hole near a corner of a bag or container to facilitate more complete emptying, improved access, or convenience, the hole can be off-center. The layer of material, referred to herein as a "bolstering," strengthening, or reinforcing film, tape, patch or sheet, may be square, circular or other appropriate outer shape with an adhesive on one side. Common adhering is by a single-sided pressure sensitive adhesive, but alternates such as applied glue, fusing/welding, or when appropriate for less tear-prone materials, staples, rivets, or other mechanical fasteners can be substituted.

In preferred embodiments, the hole in the bolstering layer is matched to the groove diameter of the device so that there is some small clearance or interference and variable but controlled preload or pressure on the groove ID. The degree of interference is associated with the intended sealing effectiveness and in coordination with any negative or positive pressure potentially used with such device in more sophisticated environments. The device piercing tip is aimed generally in the center of the hole in the material, and once pierced, the device is rotated clockwise, driving the point and angled groove to direct the bag material into said angled groove and into circumferential radial groove. Counterclockwise (CCW) installed versions can be offered if CW is not desirable.

The composition and thickness of the bolstering layer can vary according to strength needs while remaining flexible enough and thin enough to navigate the ramp behind the piercing tip. In preferred embodiments, the thickness may be in the range of 0.002 inch to 0.020 inch but can be thicker for more demanding applications. In terms of composition, the layer may be composed of any flexible yet strong and tear resistant plastic or polymeric material(s) including, without limitation, polyethylenes, including low-density polyethylenes or LDPEs; polypropylenes; PVCs; nylons, and so forth. Multi-layer structures and/or the inclusion of fibers or the like are also possible to increase strength and/or tear resistance. Regarding rigidity, the adhered bolstering layer should remain sufficiently stretchable to ride over the flange adjacent to the groove. When halfway stretched over the retaining flange is the greatest torque required, torque being represented by somewhat of a bell curve or inverted "V".

To reduce installation torque via rotation of the device, a single diameter-length slit, or better, a cross-slit (crosshair, 90-degree opposed, or a like) cut can be made in the bag material in the center hole of the bolstering layer before insertion of the device. This is quickly and easily completed and requires no separate parts to be removed; the flaps will be folded out of the way by device insertion. This single or multiple cutting reduces the amount of bag material stretch and drag on the device flange OD, directly tying to rotational resistance during device insertion.

The maximum enlarged hole diameter is controlled by the pre-cut inside diameter of the bolstering layer, or by the bag material itself if a bolstering layer is not used, the added layer tensile strength, and the adhesive strength or mechanical attachment strength to bag/container. If the 1) adhesive strength is insufficient and 2) the outside diameter or outside square or rectangle dimension is insufficient, if a tear prone material may tear and pull away from the adhesive beyond or too near the outside edge of the adhered film, there could be a leak of the bag internal contents and perceived failure of the device.

Research has proven that a sufficiently strong bolstering layer exhibiting acceptable adhesive strength and sufficient radial distance from the install hole to edge works well for a wide variety of bag materials. Going forward, new adhesive materials, geometries and/or techniques may be used as they become available or affordable as refinements to current practices when new bag materials and hole sizes or other attributes/needs warrant new solutions.

As one specific example, a generally flexible material can be cut from a rubber sheet, for example, with an install hole (centered or off-center), or a ring molded with inherent sealing lobe features to make a seal between the material attached to the bag/container and the device, thereby achieving a 2-part bolstering/sealing device added to a bag/container. The hole in the center of the bolstering multi-layer can be made slightly smaller than the hub diameter so there is preload or controllable pressure on the hub or outside diameter of the groove in said device.

Singular or multiple lobes like o-rings or the like (pressure points) that contact device surfaces may be used with varying contact area and forces for different sealing levels for ambient air pressures, and varying degrees of positive and negative pressures where these are desired for material preservation, chemical reaction, ingress or egress prevention or promotion, treatments or other processes or purposes. These sealing lobes are intended to contact the circumferential groove outside diameter (radial seal) and or the adjacent faces (facial seal) of this groove like an o-ring groove in a shaft.

Devices according to the invention may be installed by hand, but also can be installed by powered tools or machinery on or off a production line, offering more force and torque where desired, when the device might be large and or at higher speeds where many might be installed in a short period of time. Engagement of the tool or tools with the installed device can be via the serrations on the outer ring OD, the thread for the cap, or additional engagement geometry, potentially in the ID of the center aperture or ID of the outer ring or any combination thereof.

Figures 11A, 11B:
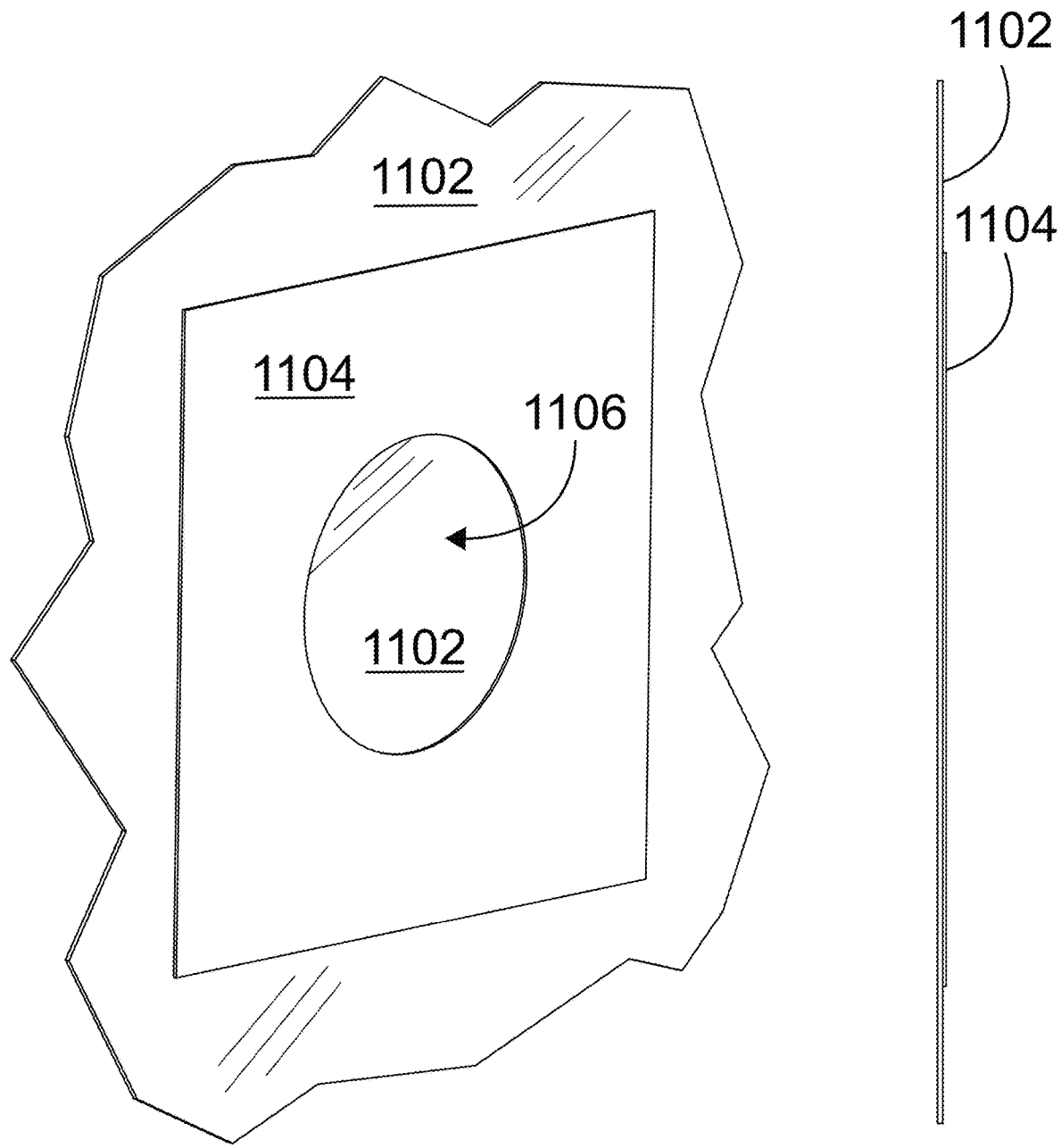
FIG. 11A illustrates a bag or container segment with an adhesive bolstering layer having a central hole cut.
FIG. 11B is a cross section through center of the hole of FIG. 11A showing the material added to the bag/container.

FIG. 11A illustrates a bag or container segment 1102 in background (no hole) with adhesive bolstering layer 1104 with hole 1106 cut in center. FIG. 11B is a cross section through center of hole showing the material 1104 added to the bag/container 1102. As discussed, the layer of material 1104 is adhered to the bag/container 1102 for guiding the installation of pour devices according to the invention, bolstering the bag/container with strength, assistance in sealing to the installed device, and compensating for potentially uncontrolled tearing if the container material is prone to tearing from a puncture or cut. Printed lines around center hole and/or perimeter can be implemented if adhered material is clear or just to assist with locating the hole for locating said piercing/sealing device by a user.

Figure 12:
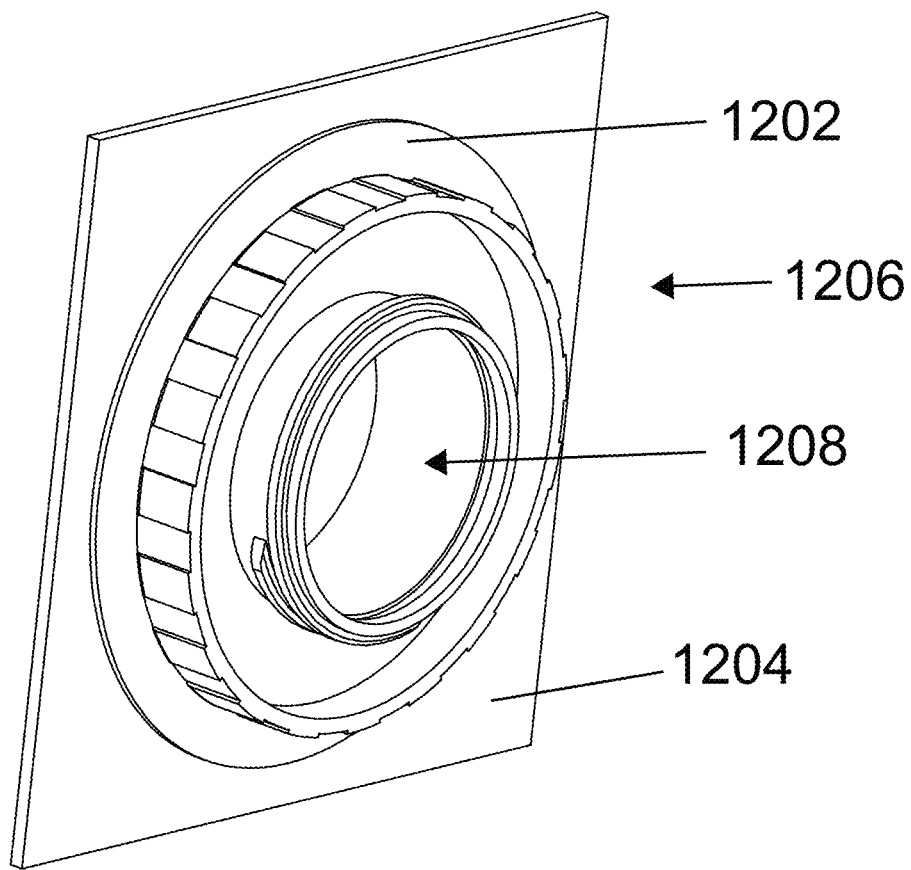
FIG. 12 shows a round bolstering/gripping washer adhered to a container with a pour device installed, allowing material to pass through a center aperture.

The bolstering/gripping material can have any appropriate peripheral shape. FIG. 12 shows a round bolstering/gripping washer 1202 adhered to container 1204 with pour device 1206 installed, allowing material to pass through center aperture 1208.

FIG. 13A is an isometric view; FIG. 13B is an orthographic view; and FIG. 13C is a cross section view of circular bolstering/sealing ring 1302 having a single sealing lobe 1304. The single lobe 1304 seals on the side wall of an o-ring groove (opposite angled entry slot side) in devices providing such a groove. The side opposite the lobe is intended for adhesion or fusion or attachment to a bag or container. The thickness of backing/film 1306 is enlarged here for illustrative purposes. In some cases, peripheral backing 1306 may be only a few thousands of an inch thick, like tough adhesive tape. It has been determined that a very tough clear tape (but not packing tape as it is very tear-prone) works well in adhesion, tear prevention and good tensile strength with only a little stretching for this application.

FIG. 14A is an isometric view; FIG. 14B is an orthographic lobe-side view; and FIG. 14C is a side view of a square or rectangular version of the bolstering patch layer of FIG. 13. The rectangular/square version offers more area and potential attachment strength for attachment to bag/container and has tested very well in flat, non-lobed versions (tape). The distance between through-hole and outside edge can be varied based on specific application needs for holding strength.

In addition to a large single lobe, FIG. 15 illustrates the use of a smaller lobe 1502 to create both facial and radial seals potentially for more demanding applications. The height of the larger facial seal has to fit through the angled guide slot, which is adjustable for larger lobes as needed, as is the groove the o-ring seals against. FIG. 15A is an isometric view; FIG. 15B is a cross section view; and FIG. 15C is a detail cross section.

Figure 17A:
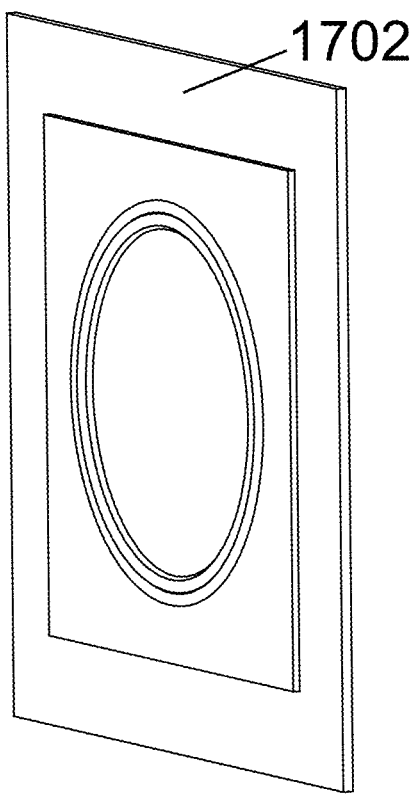
FIG. 17A shows an embodiment of a bolstering structure that can be used on a generally rigid container or generally flexible container.

FIG. 16A is an orthographic view, and FIG. 16B is a detail cross section of a multiple-lobe bolstering structure 1602 adapted to seal on the side wall of a device having an o-ring groove. Again, the side 1604 opposite the lobes is intended for adhesion or fusion/attachment to a bag/container. Multiple lobes offer an advantage of a shorter height, more easily passing through a narrower angled groove of said device. Rectangular/square version offers more area and potential attachment strength for attachment to bag/container. The distance between through-hole and outside edge can be varied based on specific application needs for holding strength.

Where there is generally not access to the internal space of a container, the embodiment of FIGS. 17A, B can be used on a generally rigid container or generally flexible container (represented here by the thick wall 1702). A hole is cut or already available in the container, and the lobed/sealing implement is attached via adhesive, fusing/welding or mechanical means (rivets, staples or the like) over that hole, offering a structure for sealing to a variety of attachments such as threaded connections, quick connection fittings, magnetic attachments, bayonet attachments, pipe and tubing connectors, and so forth.

Figure 17B:
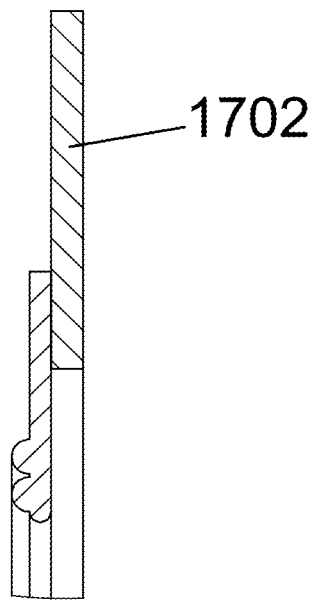
FIG. 17B is a detail cross section of the structure of FIG. 17A.

Another aspect of the embodiment of FIG. 17 is to plug a hole with a solid plug to prevent flow or to mount a device in the plug for measuring or control. Also anticipated is sufficient radius of clearance for the pouring device to be installed and seal on the one or more sealing lobes or other surfaces in radial, facial or combinations thereof.

Very strong, yet sufficiently flexible materials can be used in combination to configure the attachment ring and sealing surfaces for demanding applications including rigid tanks or tough flexible containers/bags for moving bulk solids, powder, granular materials, gasses and liquids into or out of containers, or to control pressures both positive and negative. The device of FIG. 17 can facilitate the installation of sensors such as pressure, temperature, PH, conductivity, level of liquids or solids, sight windows for visibility inside containers or barriers in addition to or separate from a purely material flow intended device.

An alternate embodiment provides a mirror image of one or more lobes on the opposite side for enhanced sealing, especially where there is an angled groove that does not go tangent with the hub or ID of the sealing groove, offering an additional, full circumferential side wall sealing surface.

Figure 18A:
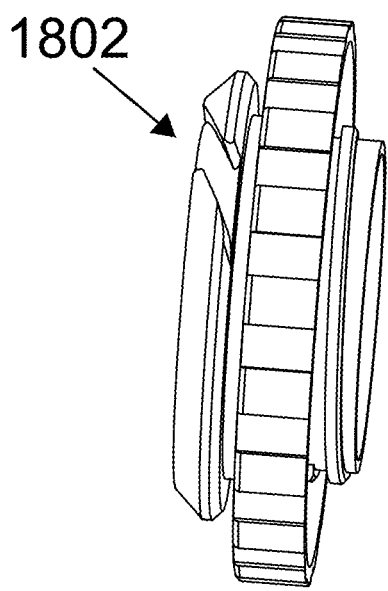
FIG. 18A is an isometric of a clockwise (CW) insertion device according to the invention.
Figure 18B:
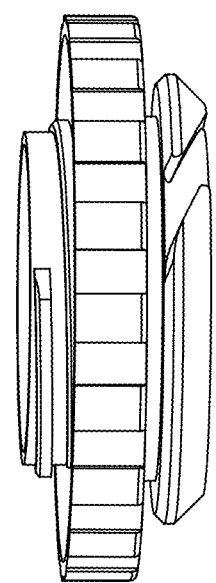
FIG. 18B is a counter-clockwise (CCW) insertion device according to the invention.

FIGS. 18, 19 illustrate one example of a port component having integrally formed ramp, piercing and cutting/tearing structures without the inclusion of a separate (i.e., metal) cutting blade. These drawings also show the use of an integrally formed proximal flange, thereby forgoing the need for a separate fastener such as a threaded nut. FIG. 18A is an isometric of a clockwise (CW) insertion version; and FIG. 18B is a counter-clockwise (CCW) insertion version of a device according to the invention. The insertion ramp 1802 here is not arranged tangent to the OD of the sealing hub (partial depth cut), but can be full depth cut (tangent to radial groove) as a variant as it does on the other device. If another full circumferential sidewall is desired, either a partial depth ramp or no ramp at all (FIG. 19) can be used, offering just a chamfer as needed to assist with push-in insertion.

Figure 19A:
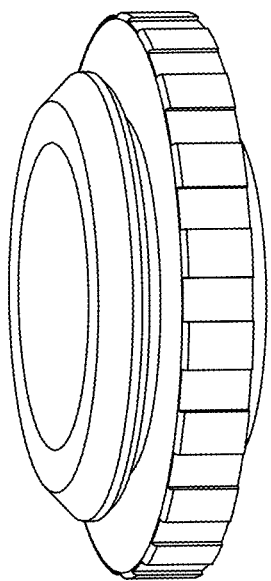
FIG. 19A is an oblique view of a push-in device with no lead-in groove, only a chamfered guide to expand the seal ID to fit into the groove.
Figure 19B:
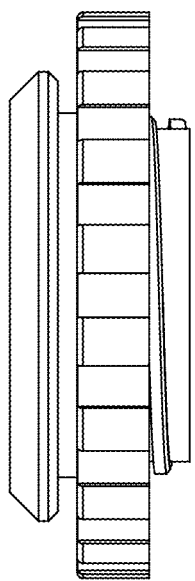
FIG. 19B is a side view of the device of FIG. 19A.
Figure 19C:
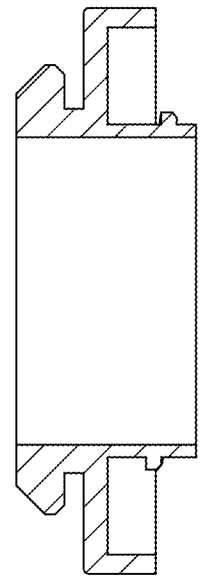
FIG. 19C is a cross sectional view of the device of FIG. 19A.

FIG. 19 illustrates a push-in device with no lead-in groove, only a chamfered guide to expand the seal ID to fit into the groove. FIG. 19A is an oblique view; FIG. 19B is a side view, and FIG. 19C is a cross sectional view. Where rotation of of the inserted device is not desirable (i.e., where infrastructure like piping may be attached that cannot be rotated because of size or weight; with limited clearance for movement; or where the angled (partial depth or full groove depth) interrupting slot in the lower groove sidewall is undesirable), a push-in version is desirable where there is not an angled ramp to drive the sealing ring onto the sealing groove. The flexibility of the attached sealing lobed or unlobed patch/tape/bolstering material is sufficient to have the lower flange of said device clear the inside diameter of the sealing ring, enabling the sealing ring to drop into the sealing groove. Push-in and pull-out forces can have large dimensional variation depending on the radial interference of the devices/holes as well as the stiffness/flexibility of the patch/sealing materials.

Where flange union-type nuts on flange or union connectors cannot be inserted through a hole in a rigid container/material, the flexible nature of the installed sealing ring enables a nut to be installed on the inside by orienting the nut generally perpendicular to the plane of the sidewall, only stretching the sealing ring in two isolated areas. Sealing of the nut on the inside of the container can be on sealing lobe or lobes facing the inside of the container, and or one or more seals can be made on the outside surface of the sealing ring or container, primary leveraging the internal flange nut as a mechanical support, where desired. Different implements to prevent the ring from dropping into the container, to hold in place and prevent rotation can likewise be implemented.

Figure 20A:
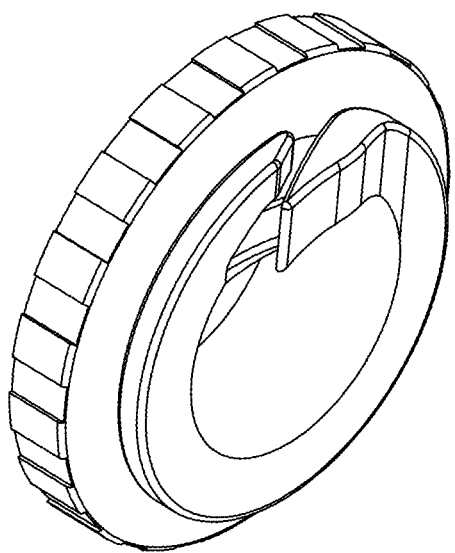
FIG. 20A depicts a plug-version device (with no through-hole) use to plug a hole using a sealing ring, or to install in a location where this device with a through hole was already installed.
Figure 20B:
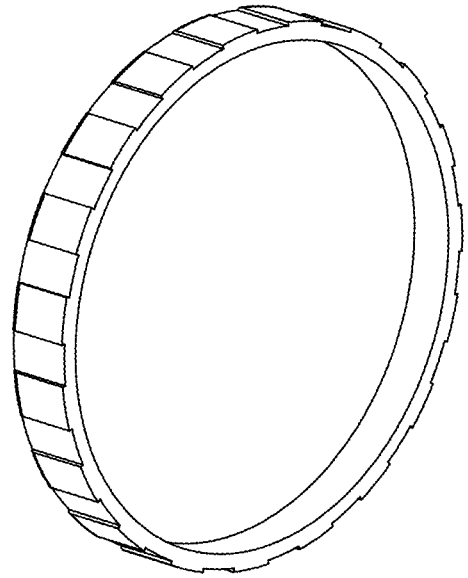
FIG. 20B illustrates a through-hole version with a cap or ID plug.

FIG. 20A, B depict a plug-version (with no through-hole) use to plug a hole using an aforementioned sealing ring, or to install in a location where this device with a through hole was already installed. A through-hole version with a cap (FIG. 20B) or ID plug (FIG. 23A or 24E) may prove more useful. A knockout (i.e., a central thin wall) can be molded in this and other embodiments of the device, making it potentially closed as molded from the factory but the center aperture knockout can be field-removable. This offers a seal from knockout as well as a cap, which can be used for sealing after knockout is removed.

Figure 21A:
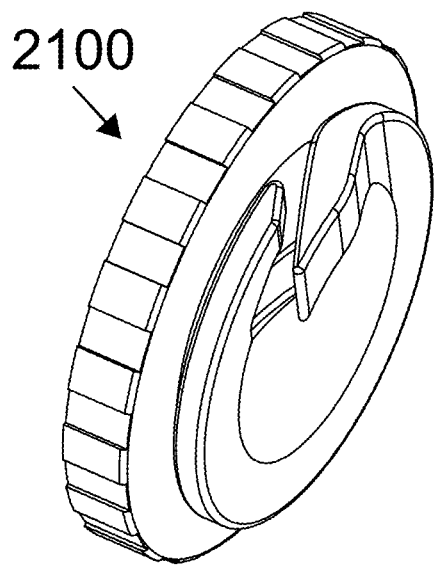
FIG. 21A is first isometric view of an embodiment that can be made in various sizes and works well with a tough bag or bolsted with tape layer having a center hole.
Figure 21B:
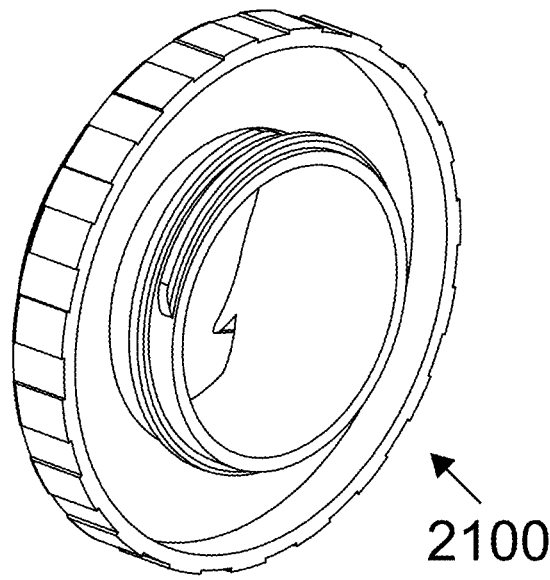
FIG. 21B is second isometric view of the embodiment of FIG. 21A.
Figure 21C:
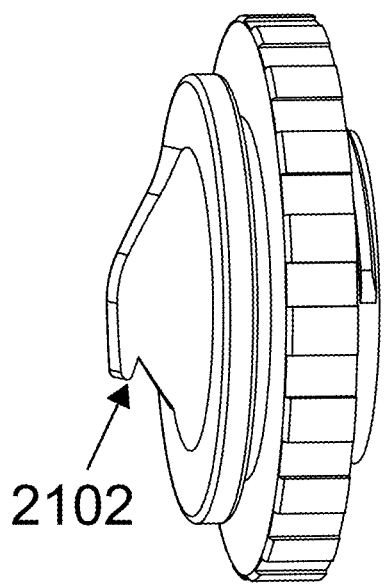
FIG. 21C is a third isometric view of the embodiment of FIG. 21A.

FIGS. 21A, B show a preferred embodiment depicted generally at 2100 that can be made in various sizes and works well with a tough bag or bolsted with tape layer having a center hole. Small versions work well for small coffee bags and bird seed; and medium versions work well for dog/cat food, hamster food, candy and the like. A larger opening facilitates flow of the larger grain pet foods. FIGS. 21C, D, E and F are isometric views, cross sections, and top and bottom views of the device better showing the piercing tip.

Figure 21D:
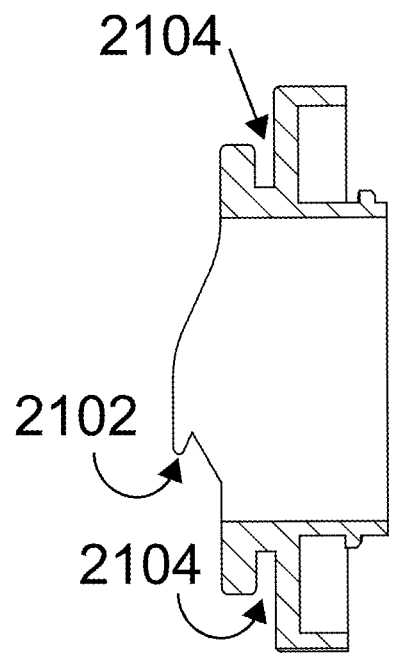
FIG. 21D is a cross sectional view of the embodiment of FIG. 21A.
Figure 21E:
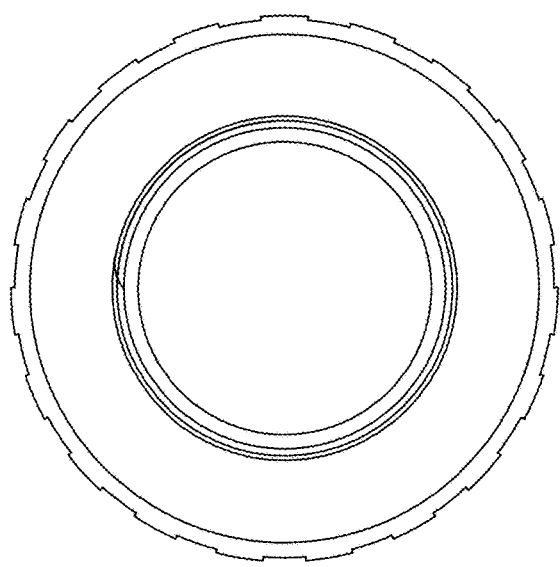
FIG. 21E is a top view of the embodiment of FIG. 21A.
Figure 21F:
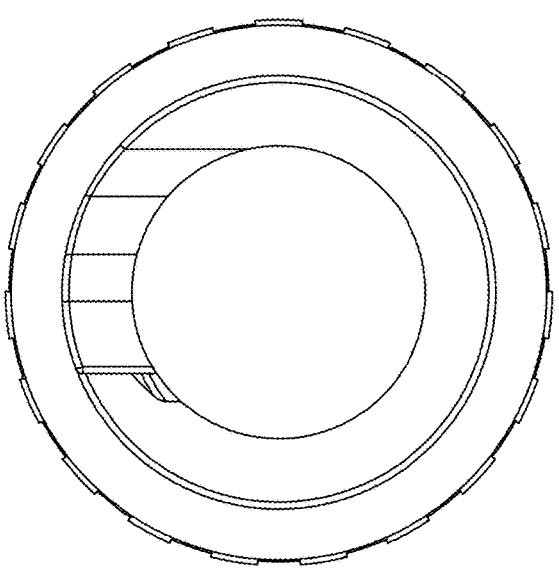
FIG. 21F is a bottom view of the embodiment of FIG. 21A, perhaps better showing the piercing tip.

The cross section of FIG. 21D shows an integrally formed piercing tip 2102 leading to a ramp structure and groove 2104 wherein the bag/container material will be positioned between integrally formed inner and out flanges. While pushing against the bag and rotating the device clockwise (CW) the opening in the bag is gradually enlarged and the controlled tear in the bag forces the bag material into the angled slot located behind the pointed piercing tip, the slot leading to a full circumferential radial groove where the bag material can seal radially on the outside diameter of the groove. The tension of the material will provide preload on the groove outside diameter and create an effective seal. The ledge or sidewall adjacent to the groove provides a strong hold to retain the device and resist inadvertent pull out or removal.

Once installed, the sealing device can be rotated in either direction. There is significant resistance to pull out or removal perpendicular of the surface of the bag or container in which it is installed making the device durable and effective for a variety of applications. When the device is ready to be removed after the bag contents have been depleted, pulling at an angle to stretch the hole in one area assists with removal. After removal, the device can even be reinstalled in the same hole repeatedly if the hole was not excessively opened during removal.

Figure 22A:
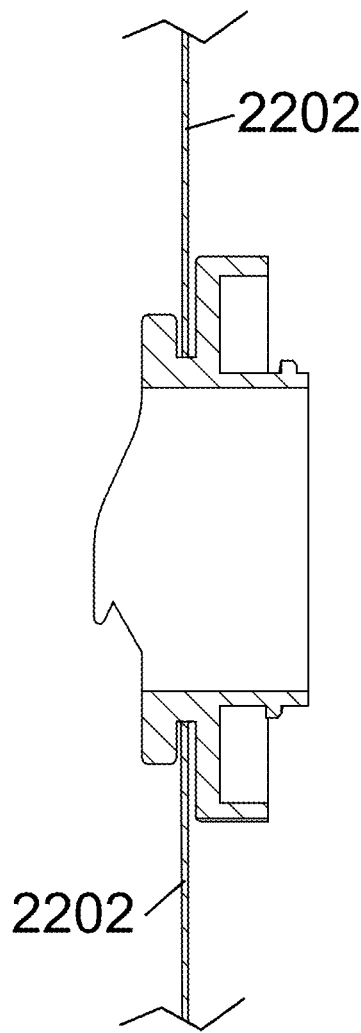
FIG. 22A is a cross section showing a bag/container material in the sealing groove of the device of FIG. 21.
Figure 22B:
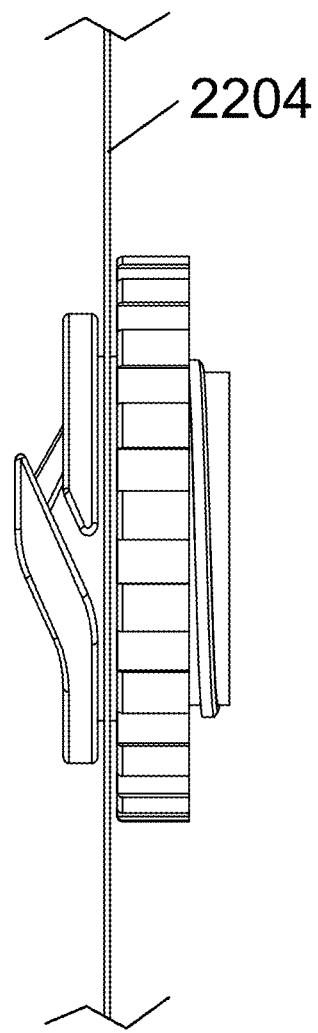
FIG. 22B is a side view showing bag material without bolstering tape/material.
Figure 22C:
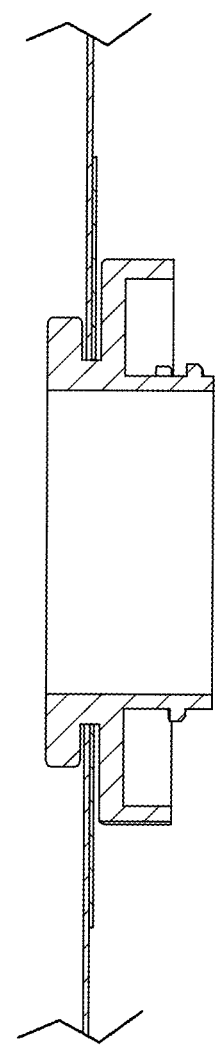
FIG. 22C is a cross section of a bag and bolstering tape shown together.

FIG. 22A is a cross section showing a bag/container material in the sealing groove 2104 of the device of FIG. 21. The bag/container material thickness 2202 is not to scale, as it can be much thinner than shown, or for a thicker rubber attachment washer as shown. FIG. 22B is a side view showing bag material 2204 without bolstering tape/material. FIG. 22C is a cross section of a bag and bolstering tape together.

Figure 23A:
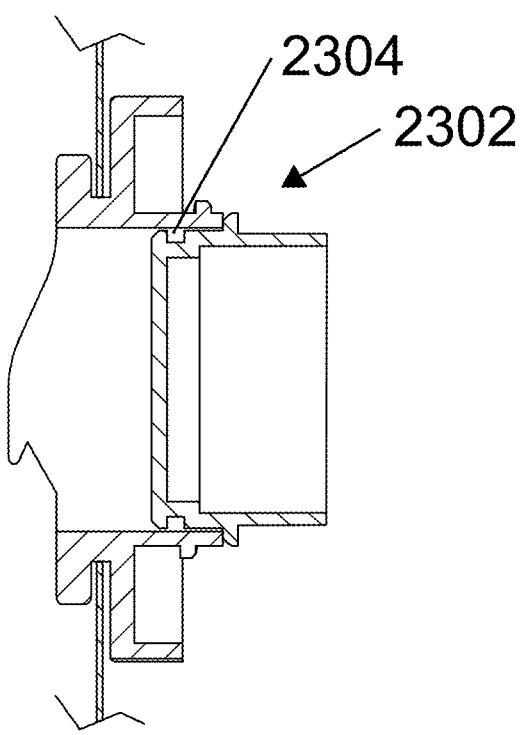
FIG. 23A illustrates a plug having an o-ring seal groove that can be used to seal the center pouring aperture of any devices disclosed herein, including the device of FIGS. 21, 22.
Figure 23B:
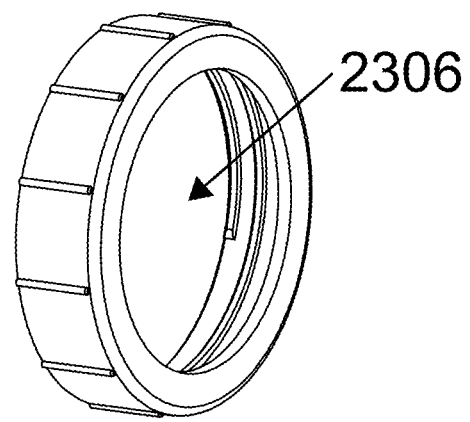
FIG. 23B depicts a cap with a central hole which may be used to hold a plug in position, or wherein the friction of an o-ring may be sufficient.

FIG. 23A illustrates a plug 2302 with o-ring seal groove 2304 (seal not shown) that can be used to seal the center pouring aperture of any devices disclosed herein, including the device of FIGS. 21, 22 (shown). A cap (FIG. 23B) with a central hole 2306 may be used to hold the plug 2302 in position, or just the friction of o-ring may be sufficient hold if so desirable by an end user.

Figure 24A:
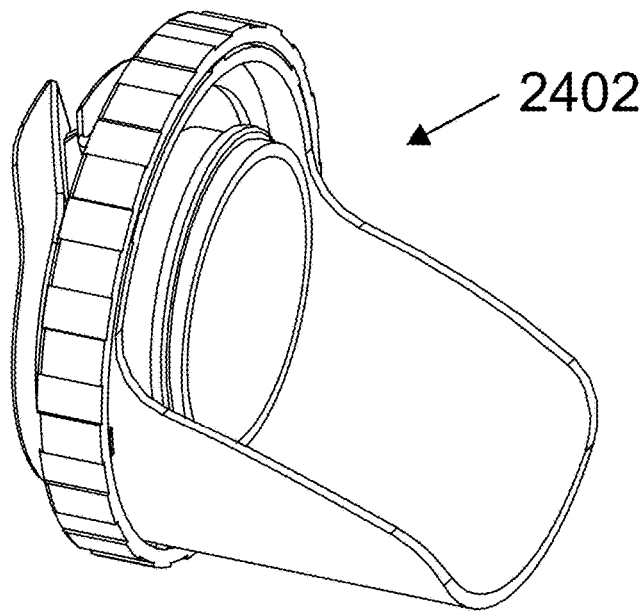
FIG. 24A shows a pouring spout with friction fit tabs to hold the spout into the ID of a grip ring on a pouring device such as the device of FIGS. 21, 22.
Figure 24B:
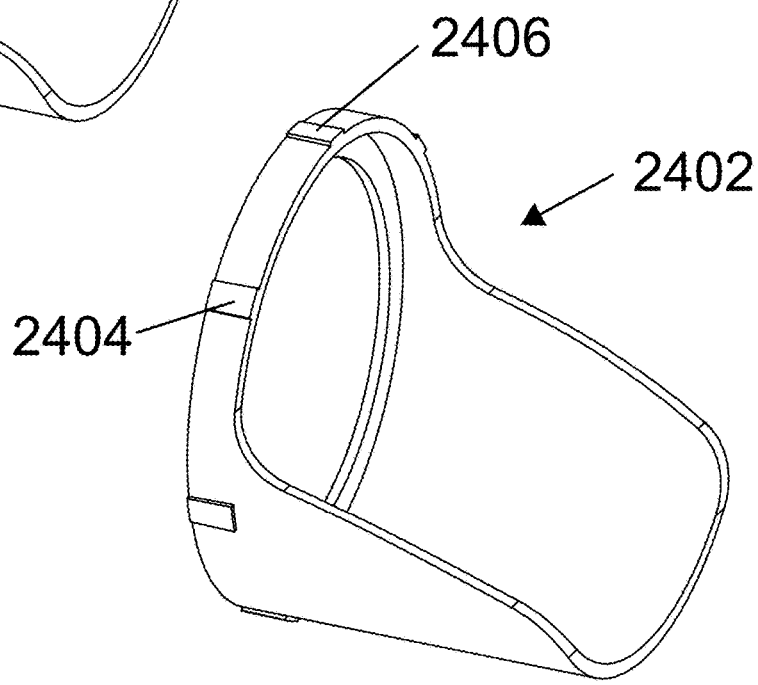
FIG. 24B shows the spout of FIG. 24A by itself.
Figure 24C:
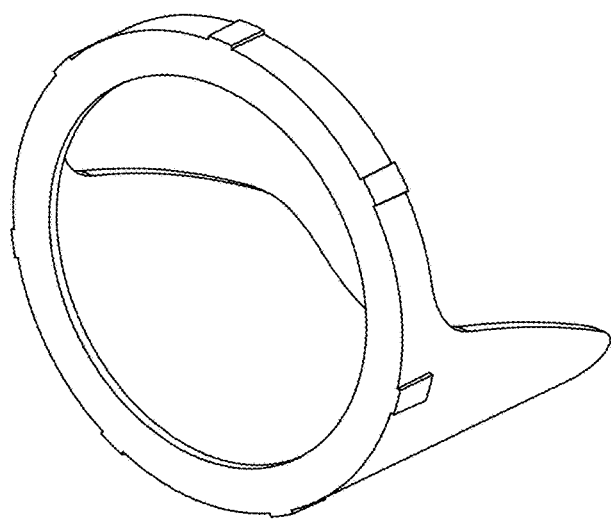
FIG. 24C is a rear view of the spout of FIG. 24A.

FIG. 24 shows a pouring spout 2402 with friction fit tabs 2404, 2406 to hold the spout into the ID of a grip ring on a pouring device such as the device of FIGS. 21, 22. FIG. 24A shows the spout received by a pouring device; FIG. 24B shows the spout itself; and FIG. 24C is a rear view. The spout offers more reach to get material into a bowl without having to hold a bag of pet food, for example, more directly over a bowl. The visibility of the flowing material is more favorable as well. The spout is easily inserted and removed, and is a simple part to plastic mold. It does not interfere with the cap's presence, and can be installed and removed with the cap in place. Alternate mounting can be via bayonet connection or snap-fit tabs if desired. The spout 2402 will likely be removed for the pouring device installation into a bag for better hand grip on the ring OD. The partial intent of the relatively light press fit reduces the probability of a potential inadvertent hard knock to the pouring device's attachment to the bag.

FIG. 24D shows the pouring device (i.e., 2100) with spout 2402 along with a plug 2410 retained by a cap 2412 having a center hole. An alternate male plug 2414 with o-ring groove 2416 is shown in FIG. 24E with no protruding grip/measuring cylinder. FIG. 24F is an exploded view showing a pour device 2100, spout 2402, plug 2410 and cap 2412. Note that the plug 2410 may serve as a small measuring cup, and could be made larger in length if desired. Indeed, all of the components of FIG. 24F may be dimensioned in accordance with desired applications. In some embodiments, cap 2412 may be screwed directly onto the threads of the pour device (i.e., 2100).

FIG. 25 illustrates an auger device 2502 operative to move material from a bag/container by at least clockwise rotation as seen from a driven end 2504 having a serrated ring 2506. This device has two inner vanes 2410 and corresponding apertures 2412. By oscillating the auger 2502 in and out while rotating slightly in CW and CCW directions, material can be moved rather quickly. The alternate is to shake the bag/container more vigorously without this device. However, shaking with the device in place slows flow as it acts as a restrictor, which can be desirable for slower filling or fast-moving material like bird seed. Also, for slower flow, the auger can act as a restrictor when rotated slowly CW or CCW.

Figures 25A, 25B:
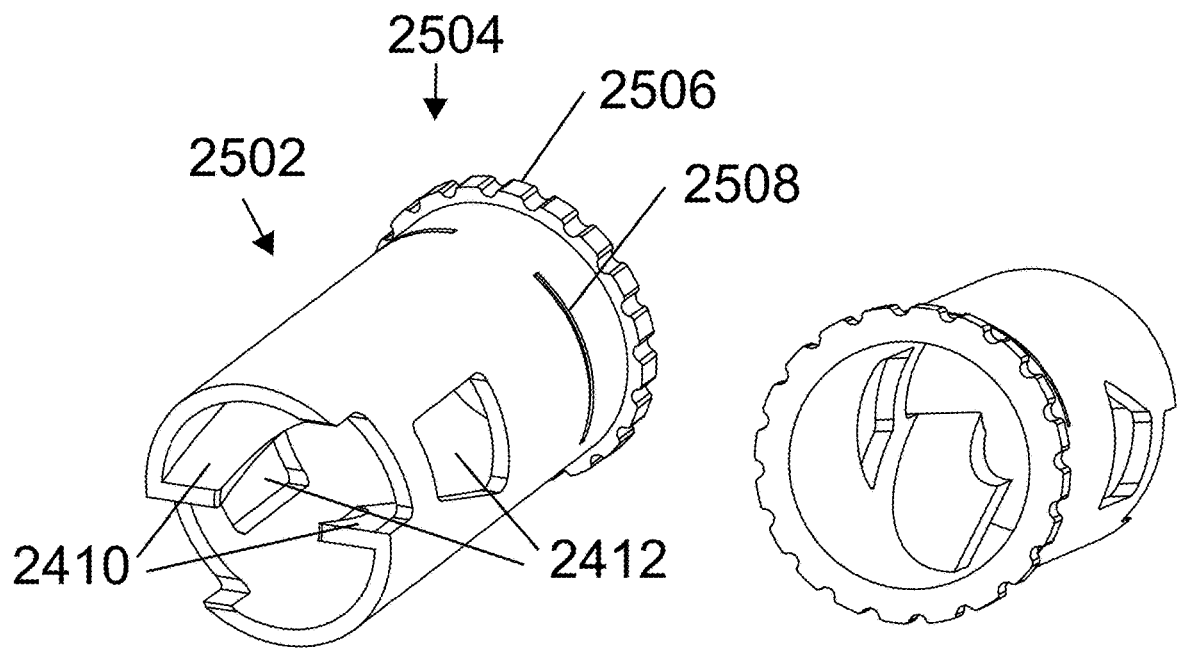
FIG. 25A is a rear oblique end view of an auger device constructed in accordance with the invention.
FIG. 25B is a front oblique view of an auger device.
Figures 25C, 25D, 25E:
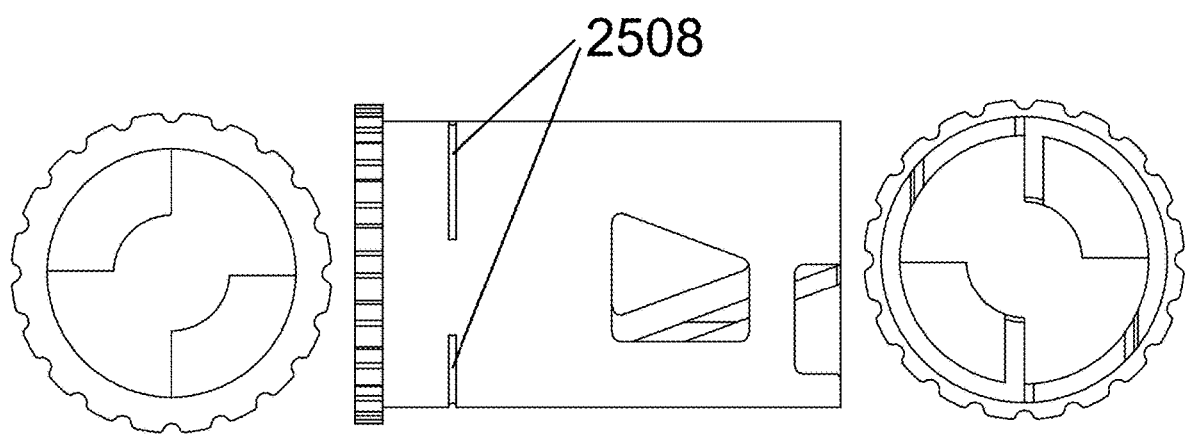
FIG. 25C is a front view of an auger device.
FIG. 25D is a side view of an auger device.
FIG. 25E is a rear view of an auger device.

FIG. 25A is a rear oblique end view of the auger; FIG. 25B is a front oblique view; FIG. 25C is a front view; FIG. 25D is a side view; and FIG. 25E is a rear view. The auger 2502 may be covered and retained by a cap, offering a seal against material leakage, or sealing out anything in the environment when not in use. The shallow groove 2508 in the OD near the driven end is a depth guide so as not to pull out the auger further than this line being visible or the openings in the OD for material flow can be partially blocked. The depth guide may alternatively be made via ink or other indicia on the outer surface of the barrel. The auger does not need to be pulled out at all, but if users want more grip than the narrow-serrated knob, they can pull it out without much implication.

For pourable materials with smaller granule sizes, finely ground consumer powdered coffee moves very quickly when reciprocating in and out while CW/CCW motion was used. For slow dispensing, no auger or slow rotating auger worked well for measuring for making a pot of coffee. For a medium device, pet food and candy material behaved predictably and moved as fast as desired. Just shaking the bag/container enables material flow through the center hole/longitudinal opening. A smaller version has three vanes and three holes in the OD, but the concept is generally the same.

FIG. 26 shows an angled pipe 2602 that attaches to a pour device such as 2100 by the a through-hole cap 2604 that slips on and goes around the bend. A lower plug 2606 uses an o-ring seal and can be held by that friction alone or replaced by another threaded cap. The pipe 2602 can swivel 360 degrees and can have a different angle, or be longer, than shown to reach another location, such as a bowl or bowls nearby. It can also be used with negative pressure to vacuum material from a bag to another location.

Figure 27:
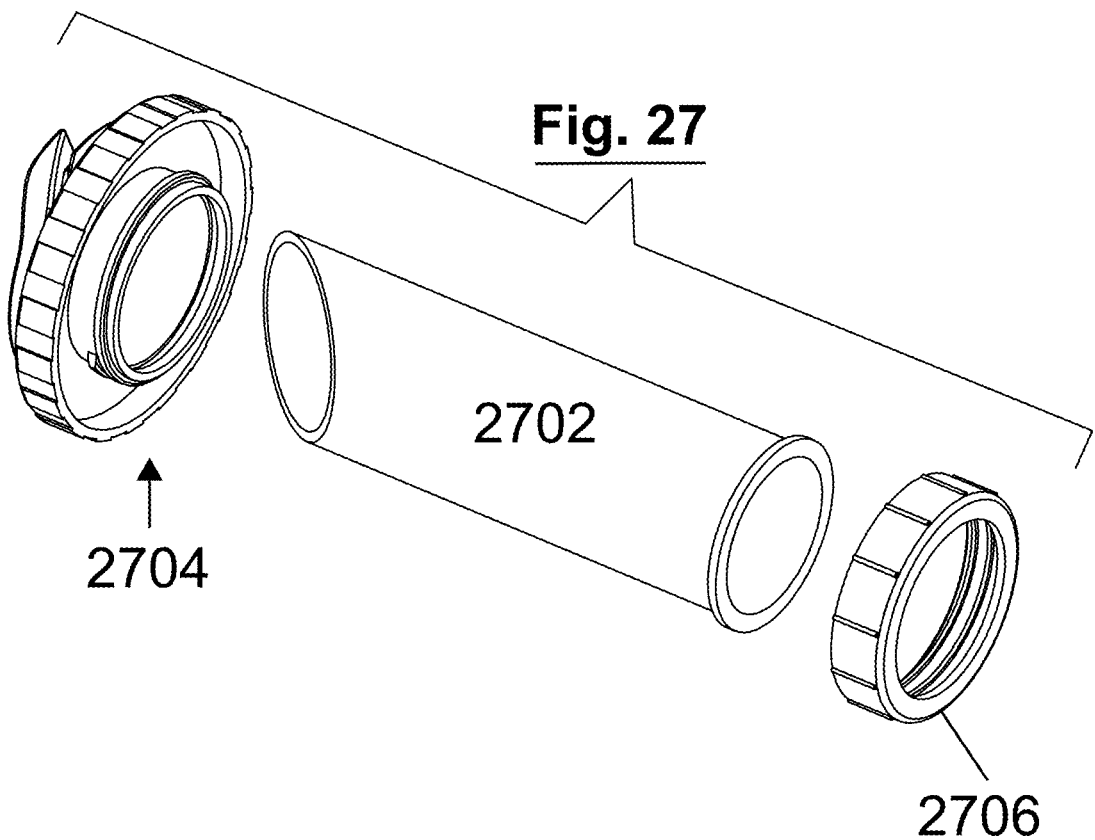
FIG. 27 shows an extension device can be utilized as a vacuum draw tube.

FIG. 27 shows an extension device 2702 can be utilized as a vacuum draw tube. It fit inside the ID of an installed pour device 2704 to reach material in the bag/container where negative pressure and flow draws material and can convey it long distances. This sealed tube arrangement can be used to introduce negative or positive pressure for any reason. Material can be moved into or out of a bag/container with such arrangement. An o-ring seal or the like can be used on the ID of the installed device (groove shown on ID) to seal the vacuum draw tube, as its depth may change as the bag goes from full to empty in a consumption scenario. Cap 2706 holds the device 2702 in position. A hose, not shown could attach to the non-tapered end of the draw tube.

Figure 28:
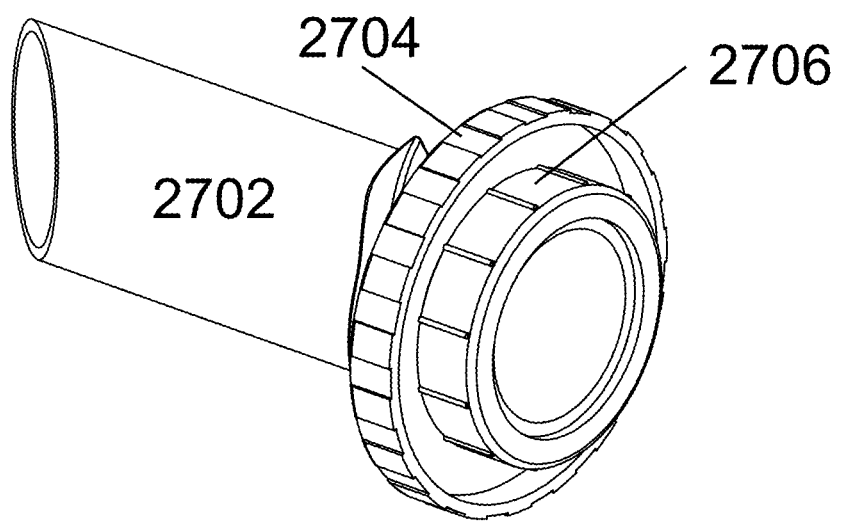
FIG. 28 shows how an extension tube device may be reversed and secured internal to a bag/container having a cap.

FIG. 28 shows how the extension tube device 2702 may be reversed and secured internal to a bag/container with cap 2706. Note that through-hole cap can be friction fitting on OD of tube to hold in place at any elevation with any length tube with tapered ferrule ring as commonly used in plumbing systems.

Figure 29:
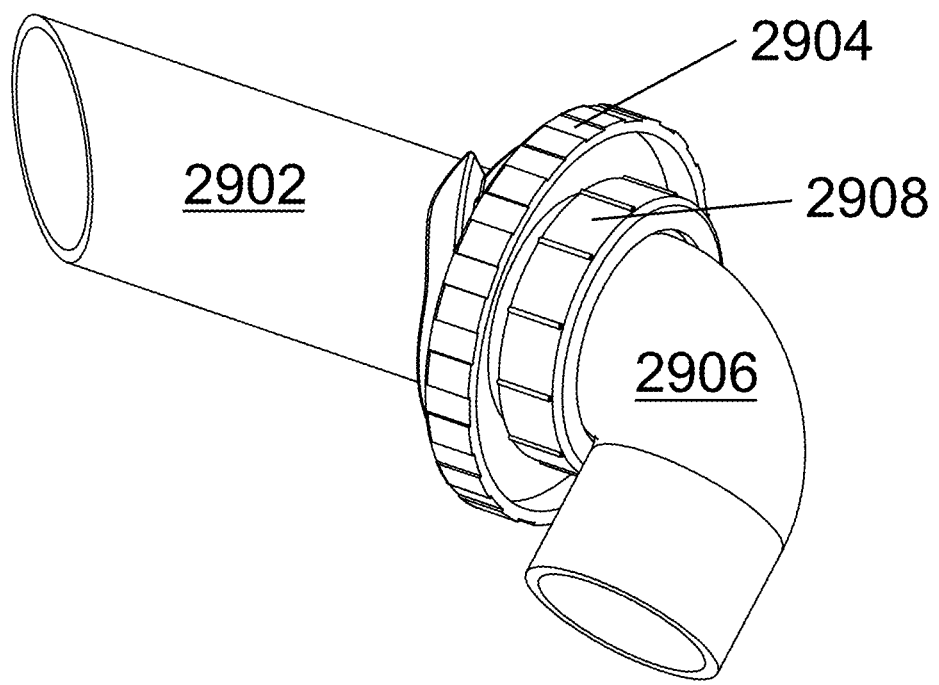
FIG. 29 shows a draw tube, installed pour device, and an elbow for redirecting granular material.

FIG. 29 shows a draw tube 2902, installed pour device 2904, and an elbow 2906 for redirecting material. Tube with end flange, and elbow with end flange are retained by through-hole nut. Loosening cap nut 2908 allows easy repositioning of elbow 2906.

Figure 30A:
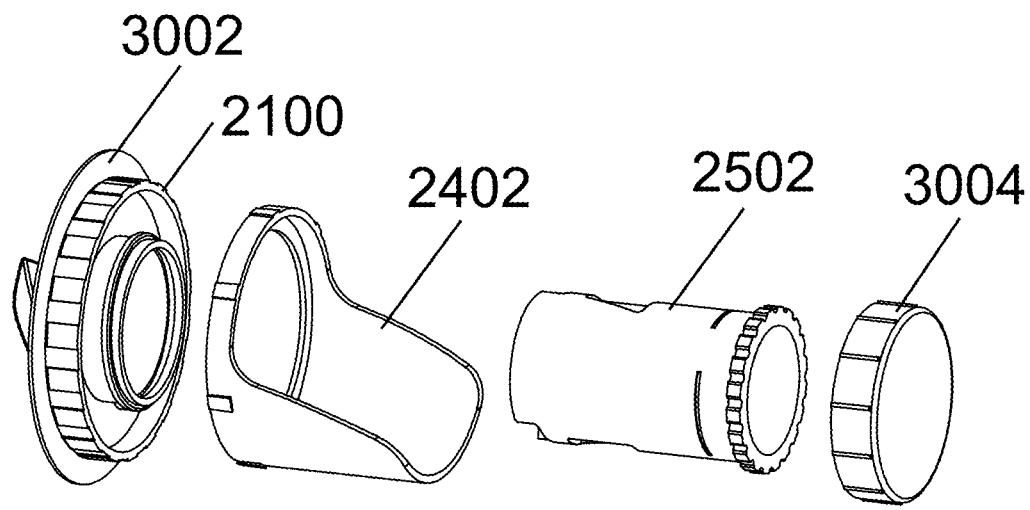
FIG. 30A depicts a combination of a pouring device, adhesive bag/container bolstering/sealing ring, spout, auger, and threaded end cap without a central bore.
Figure 30B:
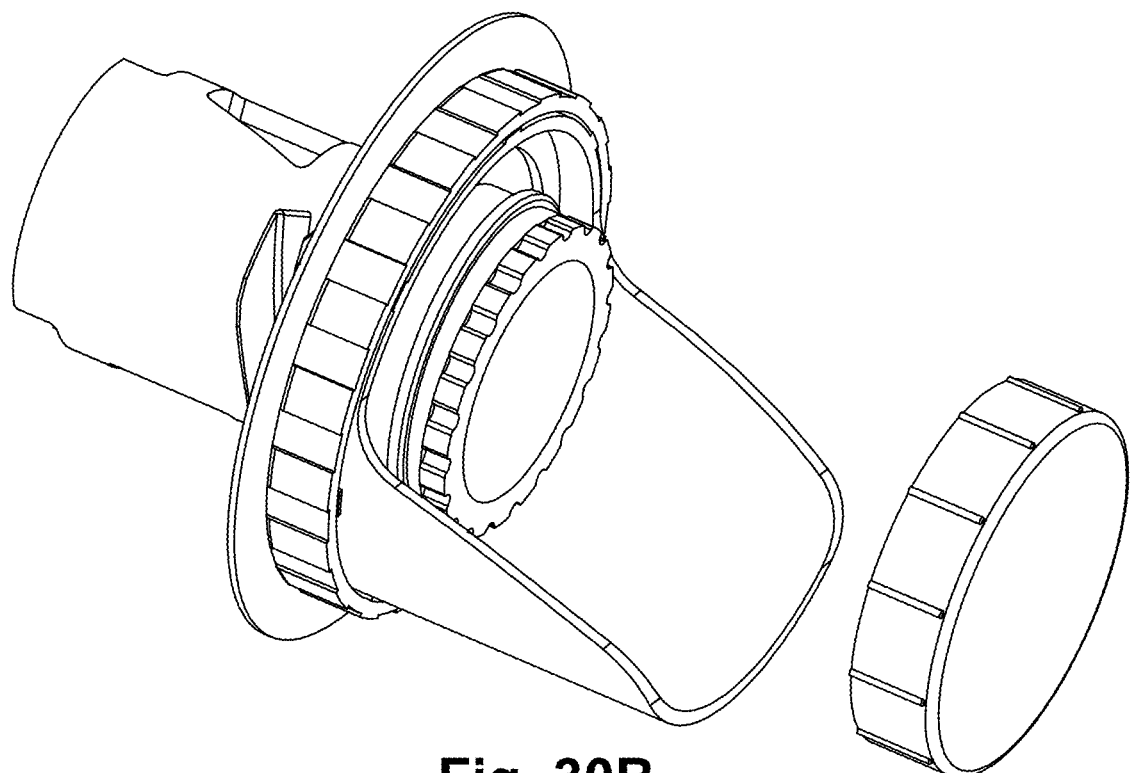
FIG. 30B is an assembled view as seen from outside a bag/container.
Figure 30C:
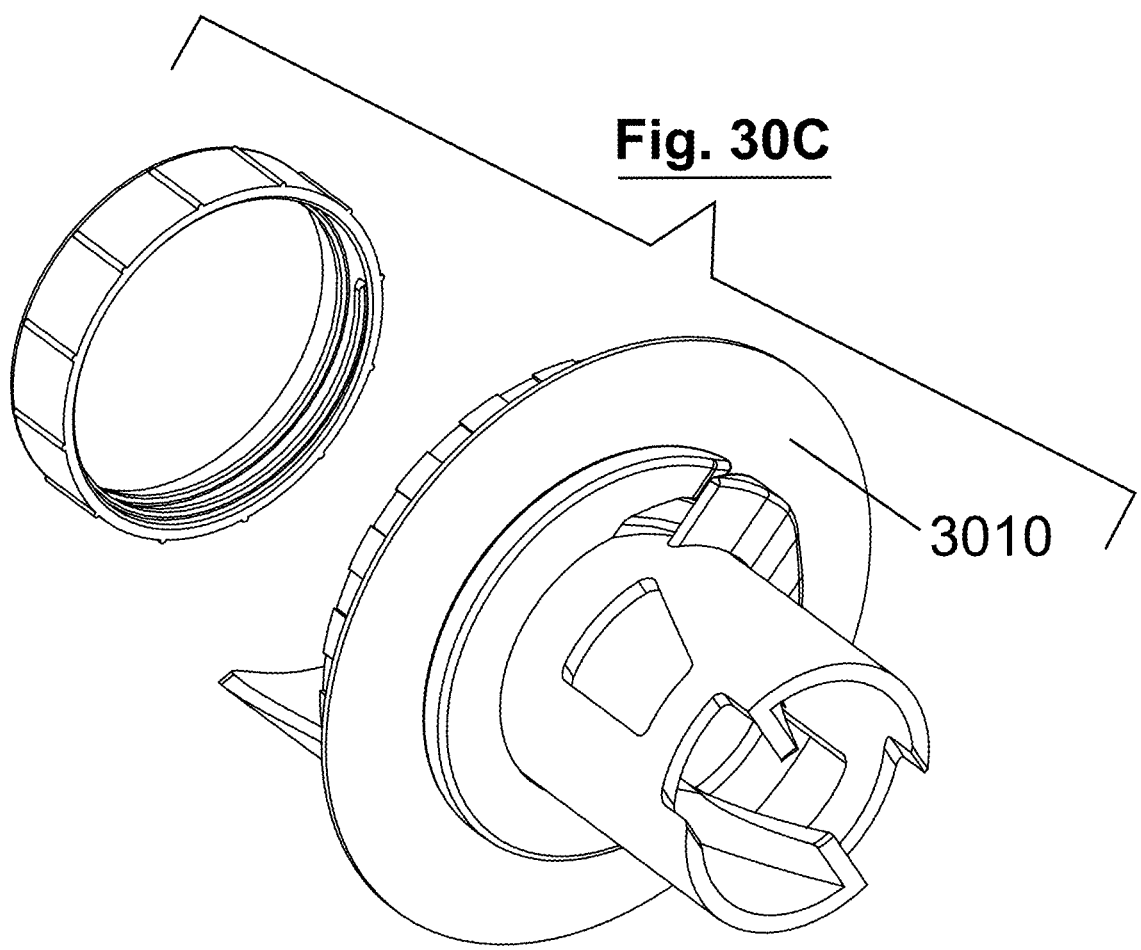
FIG. 30C is a view as seen from inside a container with a cap removed.
Figure 31:
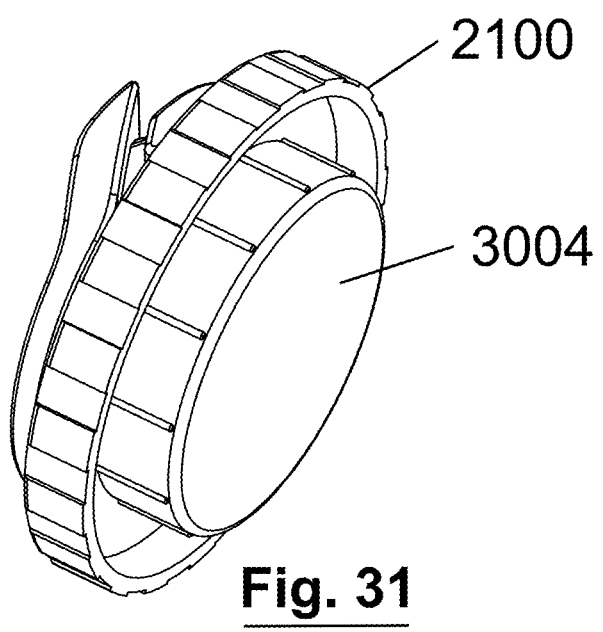
FIG. 31 shows a pour device with a solid end cap, but without an auger, pour spout, or extension tube(s).

FIG. 30A depicts a combination of a pouring device such as 2100, adhesive bag/container bolstering/sealing ring 3002, spout such as 2402, auger such as 2502, and threaded end cap 3004 (without a central bore). A small radial gap between auger OD and through-hole ID prevents material passing/leaking through. For better sealing effectiveness, a rubber seal can be used between the two parts. FIG. 30B is an assembled view as seen from outside bag container, and FIG. 30C is a view as seen from inside a container (i.e., 3010) with the cap removed. FIG. 31 shows a pour device such as device 2100 with a solid end cap 3004 without auger, pour spout, extension tube(s), etc.

The invention finds utility in a wide range of applications. Originally intended to seal a variety of flexible containers, if a hole is drilled or cut with saw or knife the invention may be of great value for a variety of rigid or semi-rigid containers. In some circumstances, the packaging informational hang tag for retail display or merchandising may be used as a hole template where it may be conveniently installed between the nut and port's flange. Candidate uses include at least the following:

Pet Foods,
Plastic pellets for injection molding (i.e., 50 pound bags),
Fertilizers,
Seeds,
Tile mortar, grout, concrete, etc.,
Flour,
Sugar,
Candy,
Cereals and Grains,
Hops,
Pool chemicals,
Coffee beans ground or unground,
Liquids,
Pharmaceuticals,
Chemicals,
Absorbents,
Others.

The invention claimed is:

1. A pour spout system for a container having a wall with inner and outer surfaces, the system comprising:
a port component having a proximal end, a distal end with a distal flange, and a through bore;
wherein the distal end of the port component includes a hole-forming structure configured for piercing the wall of the container and forming a hole in the container when the port component is rotated by a user, such that the distal flange is disposed within the container; and
wherein the port component includes a proximal structure spaced apart from the distal flange defining a circumferential groove to receive the wall of the container, with the hole in the container in communication with the through bore enabling contents within the container to be poured out through the port component.

2. A pour spout system of claim 1, further including a layer of reinforcing material applied to the outer surface of the container for controlling the forming of the hole in the container when the port component is rotated by the user.

3. The pour spout system of claim 2, wherein the layer of reinforcing material is applied with a single-sided adhesive.

4. The pour spout system of claim 3, wherein the proximal end of the port component is adapted to receive a pour-related accessory.

5. The pour spout system of claim 4, wherein the pour-related accessory includes at least one of the following:
a spout,
a plug,
an auger,
a straight or angled extension tube, and
a vacuum draw tube.

6. The pour spout system of claim 2, wherein the layer of reinforcing material has a pre-formed aperture through which the hole is formed.

7. A pour spout system of claim 1, wherein the hole-forming structure includes a piercing end leading to a ramp leading to the groove.

8. A pour spout system of claim 1, wherein the proximal structure comprises a threaded fastener.

9. A pour spout system of claim 1, wherein the proximal structure comprises an integrally formed proximal flange.

10. The pour spout system of claim 1, further including a cap configured to close off the proximal end of the port component.

11. A method of attaching the pour spout to the container having the wall with inner and outer surfaces, comprising the steps of:
providing the pour spout system of claim 1;
piercing the container with the hole-forming structure of the port component and rotating the port component until the flange of the port component is within the container, and the wall of the container is situated between the distal flange and the proximal structure.

12. The method of claim 11, including the steps of:
adhering a reinforcement material to the outer surface of the container; and
forming the hole through the reinforcement material.

13. The method of claim 12, wherein:
the reinforcement material includes a pre-formed aperture; and
forming the hole through the pre-formed aperture.

14. The method of claim 11, including the steps of:
providing a layer of reinforcing material having a one-sided adhesive; and
attaching the reinforcing material to the outer surface of the container with the one-sided adhesive.

* * * * *